United States Patent
Tatani

(10) Patent No.: US 10,572,502 B2
(45) Date of Patent: Feb. 25, 2020

(54) DATA TABLE PRODUCTION DEVICE, DATA TABLE PRODUCTION METHOD, AND DATA TABLE PRODUCTION PROGRAM

(71) Applicant: Iwasaki Electric Mfg. Co., Ltd., Sasayama-shi, Hyogo (JP)

(72) Inventor: Kenji Tatani, Sasayama (JP)

(73) Assignee: IWASAKI ELECTRIC MFG. CO., LTD., Sasayama-Shi (JP)

( * ) Notice: Subject to any disclaimer, the term of this patent is extended or adjusted under 35 U.S.C. 154(b) by 160 days.

(21) Appl. No.: 15/567,671

(22) PCT Filed: Dec. 21, 2016

(86) PCT No.: PCT/JP2016/088010
§ 371 (c)(1),
(2) Date: Oct. 19, 2017

(87) PCT Pub. No.: WO2018/116388
PCT Pub. Date: Jun. 28, 2018

(65) Prior Publication Data
US 2018/0293290 A1 Oct. 11, 2018

(51) Int. Cl.
*G06F 17/30* (2006.01)
*G06F 16/26* (2019.01)
(Continued)

(52) U.S. Cl.
CPC .............. *G06F 16/26* (2019.01); *G06F 16/13* (2019.01); *G06F 16/2282* (2019.01); *G06F 16/2379* (2019.01); *G06F 17/246* (2013.01)

(58) Field of Classification Search
USPC ........................................................ 707/741
See application file for complete search history.

(56) References Cited

U.S. PATENT DOCUMENTS 9,108,894 B1 * 8/2015 Foody .................... C12P 7/065
9,201,771 B2 * 12/2015 Olmino ............... G06F 11/3684
(Continued)

FOREIGN PATENT DOCUMENTS

JP 2004-192524 7/2004
JP 2007-183823 7/2007
(Continued)

OTHER PUBLICATIONS

International Search Report dated Mar. 7, 2017, 7 pages.

*Primary Examiner* — Kim T Nguyen
(74) *Attorney, Agent, or Firm* — Rankin, Hill & Clark LLP

(57) ABSTRACT

A data table production device includes an aggregate production unit, a database information file storage, a position information production unit, an aggregate storage, a database information image display, a change command receiver, and an aggregate changer. The aggregate production unit produces a prototype of a data table. The database information file storage stores a database information file therein. The position information production unit produces intra-file position information. The aggregate storage stores the prototype of the data table therein. The database information image display forms and displays a database information image. The change command receiver receives input of a change command. The aggregate changer changes a display position of position specification database information and changes a content of the prototype of the data table so as to be matched with a content of the change command.

1 Claim, 15 Drawing Sheets

(51) Int. Cl.
    *G06F 17/24*         (2006.01)
    *G06F 16/13*         (2019.01)
    *G06F 16/22*         (2019.01)
    *G06F 16/23*         (2019.01)

(56) References Cited

U.S. PATENT DOCUMENTS

| | | | | |
|---|---|---|---|---|
| 9,268,765 | B1* | 2/2016 | Rose Charvet | G06F 17/274 |
| 9,348,882 | B2* | 5/2016 | Risso | G06F 16/27 |
| 9,357,272 | B2* | 5/2016 | Oyman | H04N 21/6131 |
| 9,471,891 | B2* | 10/2016 | Wong | G06Q 10/06395 |
| 9,472,189 | B2* | 10/2016 | Hagg | G10L 15/183 |
| 2005/0223022 | A1 | 10/2005 | Weissman et al. | |

FOREIGN PATENT DOCUMENTS

| | | |
|---|---|---|
| JP | 2007-531941 | 11/2007 |
| WO | 2013/065823 | 5/2013 |

* cited by examiner

FIG. 10

| | 0 | 1 | 2 | 3 | 4 | 5 |
|---|---|---|---|---|---|---|
| 0 | Inspection instruction number | 6666666666 | | | | |
| 1 | Manufacturing instruction number | 1234567890 | | | | |
| 2 | Item code | X-00-000X00-X00 | | | | |
| 3 | Step name | Booster pump assembly | | | | |
| 4 | Lot number-branch number | J66666666-00 | | | | |
| 5 | Inspection item name | Maximum value | Minimum value | Average value | | |
| 6 | Current value | 2.954 | 2.596 | 2.822 | | |
| 7 | Voltage value | 198 | 194 | 196 | | |
| 8 | The number of revolutions | | | 2296 | | |
| 9 | | | | | | |
| 10 | | | | | | |

FIG. 11

|  | 0 | 1 | 2 | 3 | 4 | 5 |
|---|---|---|---|---|---|---|
| 0 | Inspection instruction number | 6666666666 |  |  |  |  |
| 1 | Manufacturing instruction number | 1234567890 |  |  |  |  |
| 2 | Item code | X-00-000X00-X00 |  |  |  |  |
| 3 | Step name | Booster pump assembly |  |  |  |  |
| 4 | Lot number-branch number | J6666666666-00 |  |  |  |  |
| 5 | Inspection item name | Maximum value | Minimum value | Average value |  |  |
| 6 | Current value | 2.954 | 2.596 | 2.822 | 2 |  |
| 7 | Voltage value | 198 | 194 | 196 | 3 |  |
| 8 | The number of revolutions |  |  | 2296 | 1 |  |
| 9 |  | 2 | 3 | 1 |  |  |
| 10 |  |  |  |  |  |  |

FIG. 15

| | 0 |
|---|---|
| 0 | 2296 — 130 |
| 1 | 2296 — 130 |
| 2 | 2296 — 130 |
| 3 | 2.822 — 130 |
| 4 | 2.954 — 130 |
| 5 | 2.596 — 130 |
| 6 | 196 — 130 |
| 7 | 198 — 130 |
| 8 | 194 — 130 |
| 9 | |
| 10 | |

DATA TABLE PRODUCTION DEVICE, DATA TABLE PRODUCTION METHOD, AND DATA TABLE PRODUCTION PROGRAM

TECHNICAL FIELD

The present invention relates to a data table production device, a data table production method, and a data table production program.

BACKGROUND ART

Patent Document 1 discloses a mapping system. In the mapping system, an input cell and a storage cell are correlated with each other. Data is input to the input cell. The storage cell belongs to a table in a database. The data input to the input cell is stored in the storage cell. The mapping system includes a selection unit, a mapping unit, a generator, and an input unit. The selection unit receives the following selection. In the selection, a file having the input cell and the table having the storage cell are selected in order to correlate the file with the table. The mapping unit receives designation of the correlation. In the correlation, the input cell included in the file selected by the selection unit is correlated with the storage cell included in the table selected by the selection unit. The generator generates mapping information. The mapping information indicates the correlation designated by the mapping unit. The input unit inputs the input data input to the file to the storage cell included in the table based on the mapping information generated by the generator. According to the mapping system disclosed in Patent Document 1, it is possible to efficiently correlate the input cell and the storage cell with each other.

Patent Document 2 discloses a support method. The support method is a method for registering registration target data in a database using a computer. The registration target data includes a data item produced in a different format and data belonging to the data item. The support method includes a format identification step, an item extraction step, a correlation information reception step, a correlation information storage step, a designation reception step, a command generation step, and a registration step. The format identification step is a step of identifying a format of the registration target data using the computer. The item extraction step is a step of extracting the data item from the registration target data using the computer based on the identified format. The correlation information reception step is a step of receiving correlation information. The correlation information indicates the correlation between the data item to be registered from the extracted data items and the data item of the database of the registration destination. The correlation information storage step is a step of storing the received correlation information in a correlation information file. The designation reception step is a step of, when receiving new registration target data, displaying the correlation information stored in the correlation information file, and receiving designation of the correlation information from the displayed correlation information. The command generation step is a step of generating a registration processing command for the database of the registration destination using the computer based on the received correlation information and registration target data. The registration step is a step of registering the new registration target data in the database using the computer according to the generated registration processing command. In the support method disclosed in Patent Document 2, registration target data such as a data sheet produced by plural different spreadsheet software can be directly imported into dedicated software by a simple operation, and registered in the database. In the support method disclosed in Patent Document 2, for the same kind of registration target data, it is possible to efficiently register the data in the database by reusing a previously-produced definition.

PRIOR ART DOCUMENTS

Patent Documents

Patent Document 1: Japanese Patent Laid-open Publication No. 2007-183823
Patent Document 2: Japanese Patent Laid-open Publication No. 2004-192524

SUMMARY OF THE INVENTION

Problems to be Solved by the Invention

However, in the mapping system disclosed in Patent Document 1 and the support method disclosed in Patent Document 2, there is a problem in that a definition of additional order in a plurality of pieces of information added to the database is complicated.

The present invention solves such a problem. An object of the present invention is to provide a data table production device, a data table production method, and a data table production program, for facilitating the definition of additional order in a plurality of pieces of information added to a database.

Solutions to the Problems

A data table production device, a data table production method, and a data table production program according to the present invention will be described with reference to the drawings. The reference numerals in the drawing are used in this column to assist understanding of the content of the invention, and it is not intended to limit the content to the illustrated scope.

In order to solve the problem, according to one aspect of the present invention, a data table production device 20 includes an aggregate production unit 70. The aggregate production unit 70 produces an information aggregate. The information aggregate includes intra-file position information 134 and information indicating the additional order of database information 122 to the database (to be described below). The database information 122 is information in which a position in the database information file is indicated by the intra-file position information 134. The intra-file position information 134 indicates at least two positions in a plurality of pieces of database information 122 in the database information file. The database information file includes the plurality of pieces of database information 122. The database information 122 is information added to the database. The data table production device 20 further includes a database information file storage 72 and a position information production unit 74. The database information file storage 72 stores the database information file. In the database information file, the plurality of pieces of database information 122 and information indicating the display position of each piece of database information 122 are continuously provided according to a predetermined rule. Using the predetermined rule as a clue, the position information production unit 74 produces the intra-file position information 134 with respect to at least two of the plurality of pieces of database information 122 included in the database information file. The aggregate production unit 70 produces the information aggregate (to be described below). The information aggregate includes position specification database information 130 in addition to the intra-file position information 134 and the information indicating the additional order of the database information 122 to the database. The position specification database information 130 is the database information 122 in which the intra-file position information 134 is produced by the position information production unit 74 in the plurality of pieces of database information 122 included in the database information file. The intra-file position information 134 indicates the position of the position specification database information 130 in the database information file. The information indicating the additional order of the position specification database information 130 to the database is included in the information aggregate so as to be at least a part of the display position information 132. The display position information 132 indicates the display position of the position specification database information 130. The data table production device 20 further includes an aggregate storage 76, a database information image display 78, a change command receiver 80, and an aggregate changer 82. The aggregate storage 76 stores an information aggregate. The database information image display 78 forms and displays a database information image. In the database information image, at least two pieces of the position specification database information 130 are displayed at at least two display positions of the position specification database information 130, respectively. The database information image is formed based on the display position information 132. The change command receiver 80 receives input of a change command. The change command is a command indicating a change content of the form of the database information image. When the change command is a command to change the display position of any piece of the position specification database information 130 indicated in the database information image, the aggregate changer 82 changes the display position of the position specification database information 130 indicated by the change command. When the change command is a command to change the display position of any piece of the position specification database information 130 indicated in the database information image, the aggregate changer 82 changes the content of the following display position information 132 in the information aggregate such that the content of the following display position information 132 is matched with the content of the change command. The display position information 132 is information indicating the display position of the position specification database information 130 indicated by the change command.

The information aggregate produced by the aggregate production unit 70 includes the display position information 132 of the position specification database information 130 and the intra-file position information 134 of the position specification database information 130. At least a part of the display position information 132 is information indicating the additional order of the position specification database information 130 to the database. The database information 122 included in a database information file (the database information file is pursuant to the same rule as the database information file of a source of the aggregate) can be added to the database in the additional order indicated by the display position information 132 included in the aggregate. Therefore, the aggregate can be used as a data table for adding the database information 122 to the database. When the change command received by the change command receiver 80 is an command to change the display position of any piece of the position specification database information 130 indicated in the database information image, as the display position is changed, the content of the information aggregate usable as the data table is changed so as to be matched with the content of the change command. As described above, the aggregate includes the display position information 132. At least a part of the display position information 132 is information indicating the additional order of the position specification database information 130 to the database. As a result, as the display position of any piece of the position specification database information 130 is changed, the additional order of the position specification database information 130 to the database is also changed so as to be matched with the content of the change command. The additional order of the position specification database information 130 is changed as the display position is changed, so that the user of the data table production device 20 of the present invention can understand a process of defining the additional order of the position specification database information 130 to the database using the database information image displayed on the database information image display 78. Because the process of defining the additional order of the position specification database information 130 can be understood by the database information image, the definition of the additional order of the position specification database information 130 can be facilitated compared with the case that the definition process cannot be understood by the database information image. Additionally, the information aggregate usable as the data table is produced from the database information file stored in the database information file storage 72. Therefore, the user of the data table production device 20 of the present invention can easily understand which piece of the position specification database information 130 at which position in the database information file is added to the database in what order. When this can be easily understood, confirmation work concerning which piece of the position specification database information 130 in the database information file is added to the database in what order can be reduced in defining the additional order of the position specification database information 130, compared with the case that it cannot be easily understood. Because the confirmation work can be reduced, the definition of the additional order of the position specification database information 130 can be facilitated, compared with the case that the confirmation work cannot be reduced.

Desirably, the change command receiver 80 includes a transfer command receiver 90. The transfer command receiver 90 receives information indicating transfer destinations of at least two pieces of position specification database information 130 indicated in the database information image. The information indicating the transfer destination includes information indicating the additional order of the position specification database information 130 to the database. In this case, desirably, the aggregate changer 82 includes a transfer destination information addition unit 100, a database information image update unit 102, and a display position information changer 104. The transfer destination information addition unit 100 adds information indicating the transfer destination to the information aggregate such that the information indicating the transfer destination is correlated with the position specification database information 130 on a one-to-one basis. The database information image update unit 102 updates the database information image such that each of the plurality of pieces of position specification database information 130 is transferred to the transfer destination of each of the plurality of pieces of position specification database information 130. The display position information changer 104 changes the content of the display position information 132 such that the display position of each of the plurality of pieces of position specification database information 130 is the transfer destination.

When the transfer destination information addition unit 100 adds the information indicating the transfer destination to the information aggregate such that the information indicating the transfer destination is correlated with the position specification database information 130 on a one-to-one basis, the following specification can be performed from the information indicating the transfer destination, which is received by the transfer command receiver 90. That is, the display position of the position specification database information 130 and the additional order of the position specification database information 130 are specified in the case that the display position information 132 is damaged due to an unexpected situation after the information indicating the transfer destination is added to the information aggregate. This is because the information indicating the transfer destination is included in the information aggregate in addition to the display position information 132. Because such specification is possible, a possibility that the information aggregate becomes unusable can be reduced, compared with the case that such specification is not possible.

Alternatively, desirably, the information indicating the transfer destination includes information indicating the following position as the information indicating the additional order of the position specification database information 130. The position is a position of each of at least two pieces of position specification database information 130 in a column described as follows. The column is a column formed by displaying at least two pieces of position specification database information 130 side by side. In this case, desirably, the database information image update unit 102 includes an information image deletion unit 110 and an information image addition unit 112. The information image deletion unit 110 deletes any one piece of position specification database information 130, of which the transfer destination is received by the transfer command receiver 90, from the database information image. The information image addition unit 112 forms an area where at least two pieces of position specification database information 130 are displayed side by side according to the information indicating the position of each of at least two pieces of position specification database information 130 in the database information image.

In this case, in the database information image, the additional order of the position specification database information 130 is indicated while being correlated with the column. When the additional order of the position specification database information 130 is indicated while being correlated with the column, the additional order is easily understood compared with the case that the position specification database information 130 is not indicated so as to form any column. Because the additional order is easily understood, the confirmation work concerning which piece of the position specification database information 130 is added to the database in what order can be reduced. Because the confirmation work can be reduced, the definition of the additional order of the position specification database information 130 can be facilitated, compared with the case that the confirmation work cannot be reduced.

According to another aspect of the present invention, a data table production method includes an aggregate production step S224. The aggregate production step S224 is a step in which a computer 30 connected to a display device 32 produces an information aggregate. The information aggregate includes the intra-file position information 134 and the information indicating the additional order of database information 122 to the database (to be described below). The database information 122 is information in which a position in the database information file is indicated by the intra-file position information 134. The intra-file position information 134 indicates at least two positions in a plurality of pieces of database information 122 in the database information file. The database information file includes the plurality of pieces of database information 122. The database information 122 is information added to the database. The computer 30 includes a memory 40, an information processor 42, input receivers 44, 46, and an I/O 52. The memory 40 stores information therein. The information processor 42 processes the information stored in the memory 40. The input receivers 44, 46 receive the information input from the user. The I/O 52 outputs information to the display device 32. The data table production method further includes a database information file storage step S220 and a position information production step S222. In the database information file storage step S220, the memory 40 stores the database information file therein. In the database information file, the plurality of pieces of database information 122 and the information indicating the display position of each piece of the database information 122 are continuously provided according to a predetermined rule. In the position information production step S222, the information processor 42 produces the intra-file position information 134 with respect to at least two of the plurality of pieces of database information 122 included in the database information file using the predetermined rule as a clue. In the aggregate production step S224, the information processor 42 includes a step of producing the information aggregate described as follows. The information aggregate includes position specification database information 130 in addition to the intra-file position information 134 and the information indicating the additional order of the database information 122 to the database. The position specification database information 130 is the database information 122 in which the intra-file position information 134 is produced in the position information production step S222 in the plurality of pieces of database information 122 included in the database information file. The intra-file position information 134 indicates the position of the position specification database information 130 in the database information file. The information indicating the additional order of the position specification database information 130 to the database is included in the information aggregate so as to be at least a part of the display position information 132. The display position information 132 indicates the display position of the position specification database information 130. The data table production method further includes an aggregate storage step S226, a database information image display step S228, a change command reception step S230, and an aggregate change step S244. In the aggregate storage step S226, the memory 40 stores the information aggregate therein. In the database information image display step S228, the information processor 42 forms and displays the database information image. In the database information image, at least two pieces of the position specification database information 130 are displayed at at least two display positions of the position specification database information 130, respectively. The database information image is formed based on the display position information 132. In the database information image display step S228, the information processor 42 controls the display device 32 so as to display the database information image by outputting the information to the display device 32 through the I/O 52. In the change command reception step S230, the input receivers 44, 46 receive the input of the change command. The change command is a command indicating a change content of the form of the database information image. In the aggregate change step S244, when the change command is a command to change the display position of any piece of the position specification database information 130 indicated in the database information image, the information processor 42 changes the display position of the position specification database information 130 indicated by the change command. In the aggregate change step S244, when the change command is the command to change the display position of any piece of the position specification database information 130 indicated in the database information image, the information processor 42 changes the content of the following display position information 132 in the information aggregate such that the content of the following display position information 132 is matched with the content of the change command. The display position information 132 is information indicating the display position of the position specification database information 130 indicated by the change command.

According to still another aspect of the present invention, a data table production program causes the computer connected to the display device 32 to execute the aggregate production step S224. The aggregate production step S224 is a step in which the computer 30 connected to the display device 32 produces the information aggregate. The information aggregate includes the intra-file position information 134 and the information indicating the additional order of database information 122 to the database (to be described below). The database information 122 is information in which a position in the database information file is indicated by the intra-file position information 134. The intra-file position information 134 indicates at least two positions in a plurality of pieces of database information 122 in the database information file. The database information file includes the plurality of pieces of database information 122. The database information 122 is information added to the database. The computer 30 includes a memory 40, an information processor 42, input receivers 44, 46, and an I/O 52. The memory 40 stores information therein. The information processor 42 processes the information stored in the memory 40. The input receivers 44, 46 receive the information input from the user. The I/O 52 outputs information to the display device 32. The data table production program causes the computer 30 to further execute the database information file storage step S220 and the position information production step S222. In the database information file storage step S220, the memory 40 stores the database information file therein. In the database information file, the plurality of pieces of database information 122 and the information indicating the display position of each piece of the database information 122 are continuously provided according to a predetermined rule. In the position information production step S222, the information processor 42 produces the intra-file position information 134 with respect to at least two of the plurality of pieces of database information 122 included in the database information file using the predetermined rule as a clue. In the aggregate production step S224, the information processor 42 includes a step of producing the information aggregate described as follows. The information aggregate includes position specification database information 130 in addition to the intra-file position information 134 and the information indicating the additional order of the database information 122 to the database. The position specification database information 130 is the database information 122 in which the intra-file position information 134 is produced in the position information production step S222 in the plurality of pieces of database information 122 included in the database information file. The intra-file position information 134 indicates the position of the position specification database information 130 in the database information file. The information indicating the additional order of the position specification database information 130 to the database is included in the information aggregate so as to be at least a part of the display position information 132. The display position information 132 indicates the display position of the position specification database information 130. The data table production program causes the computer 30 to further execute the aggregate storage step S226, the database information image display step S228, the change command reception step S230, and the aggregate change step S244. In the aggregate storage step S226, the memory 40 stores the information aggregate therein. In the database information image display step S228, the information processor 42 forms and displays the database information image. In the database information image, at least two pieces of the position specification database information 130 are displayed at at least two display positions of the position specification database information 130, respectively. The database information image is formed based on the display position information 132. In the database information image display step S228, the information processor 42 controls the display device 32 so as to display the database information image by outputting the information to the display device 32 through the I/O 52. In the change command reception step S230, the input receivers 44, 46 receive the input of the change command. The change command is a command indicating a change content of the form of the database information image. In the aggregate change step S244, when the change command is a command to change the display position of any piece of the position specification database information 130 indicated in the database information image, the information processor 42 changes the display position of the position specification database information 130 indicated by the change command. In the aggregate change step S244, when the change command is the command to change the display position of any piece of the position specification database information 130 indicated in the database information image, the information processor 42 changes the content of the following display position information 132 in the information aggregate such that the content of the following display position information 132 is matched with the content of the change command. The display position information 132 is information indicating the display position of the position specification database information 130 indicated by the change command.

Effects of the Invention

In the data table production device, the data table producing method, and the data table producing program of the present invention, the definition of the additional order in the plurality of pieces of information added to the database can be facilitated.

BRIEF DESCRIPTION OF THE DRAWINGS

FIG. 10 is a conceptual diagram illustrating an example of a database information image according to the embodiment of the present invention.

FIG. 11 is a conceptual diagram illustrating an example of a database information image during input of a position change command according to the embodiment of the present invention.

FIG. 15 is a conceptual diagram illustrating the database information image after the movement of the position specification database information according to the embodiment of the present invention.

EMBODIMENT OF THE INVENTION

Figure 1:
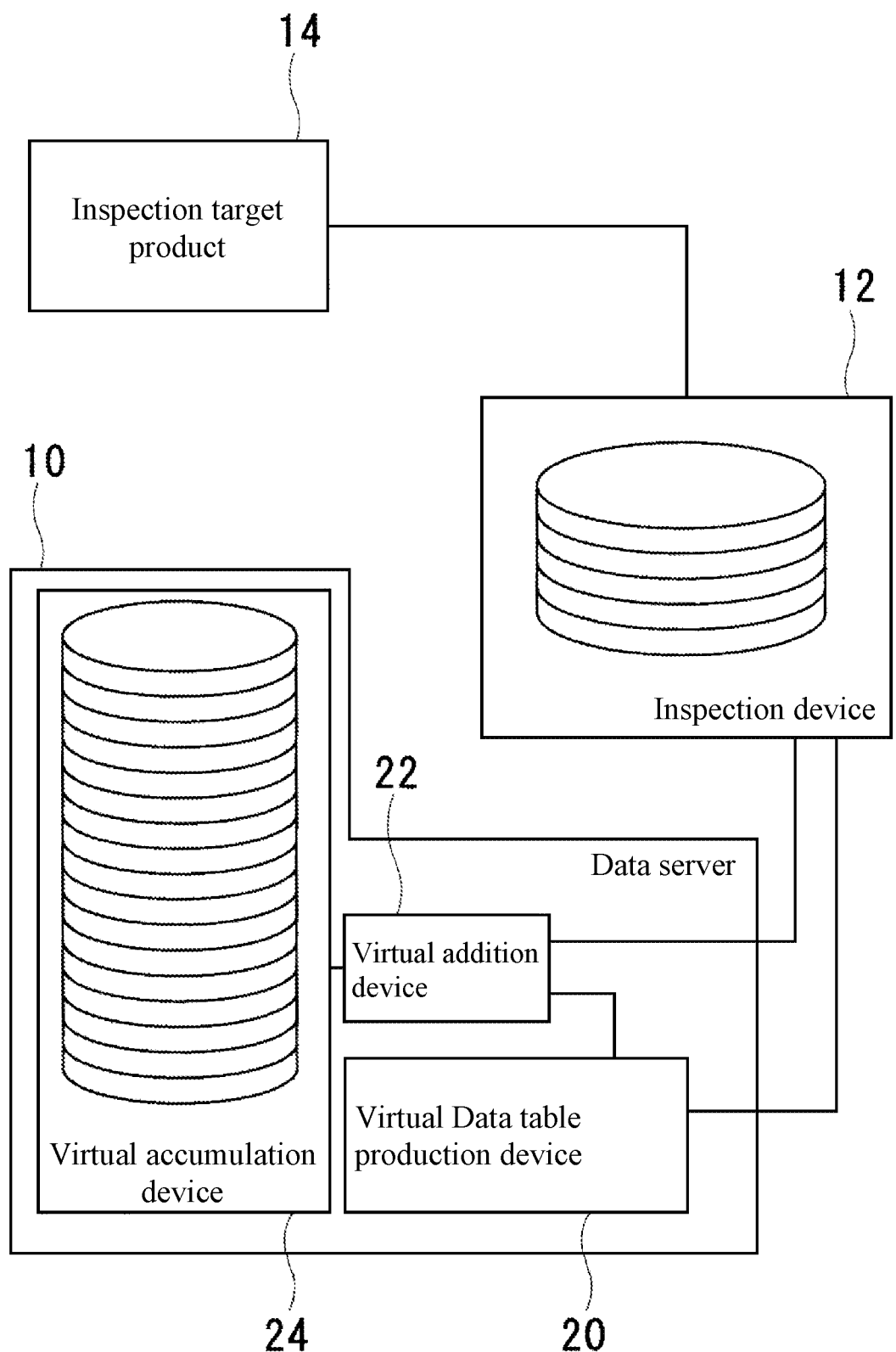
FIG. 1 is a conceptual diagram illustrating a configuration of a database system according to an embodiment of the present invention.

Hereinafter, an embodiment of the present invention will be described with reference to the drawings. In the following description, the same part is designated by the same reference numeral. The same part has the same name and function. Therefore, the detailed description of the same part will not be repeated.

[Description of Data Storage System]

The embodiment of the present invention will be described below. FIG. 1 is a conceptual diagram illustrating a configuration of a database system of the embodiment. The configuration of the database system of the embodiment will be described with reference to FIG. 1. The database system of the embodiment includes a data server 10 and an inspection device 12. The data server 10 accumulates information. The inspection device 12 inspects an inspection target product 14. The inspection device 12 transmits the information obtained through the inspection to the data server 10. In the embodiment, the inspection device 12 transmits the information obtained through the inspection as the database information file. The structure of the database information file will be described later.

The data server 10 includes a virtual data table production device 20, a virtual addition device 22, and a virtual accumulation device 24. The virtual data table production device 20 produces a data table. In the embodiment, the data table indicates the additional order of the information transmitted by the inspection device 12. The virtual addition device 22 transmits the information transmitted by the inspection device 12 to the virtual accumulation device 24 based on the data table produced by the virtual data table production device 20. The virtual accumulation device 24 accumulates the information transmitted by the virtual addition device 22. In the embodiment, a known computer 30 connected to a known display device 32 executes a program, thereby making the data server 10.

[Description of Hardware Configuration of Computer]

Figure 2:
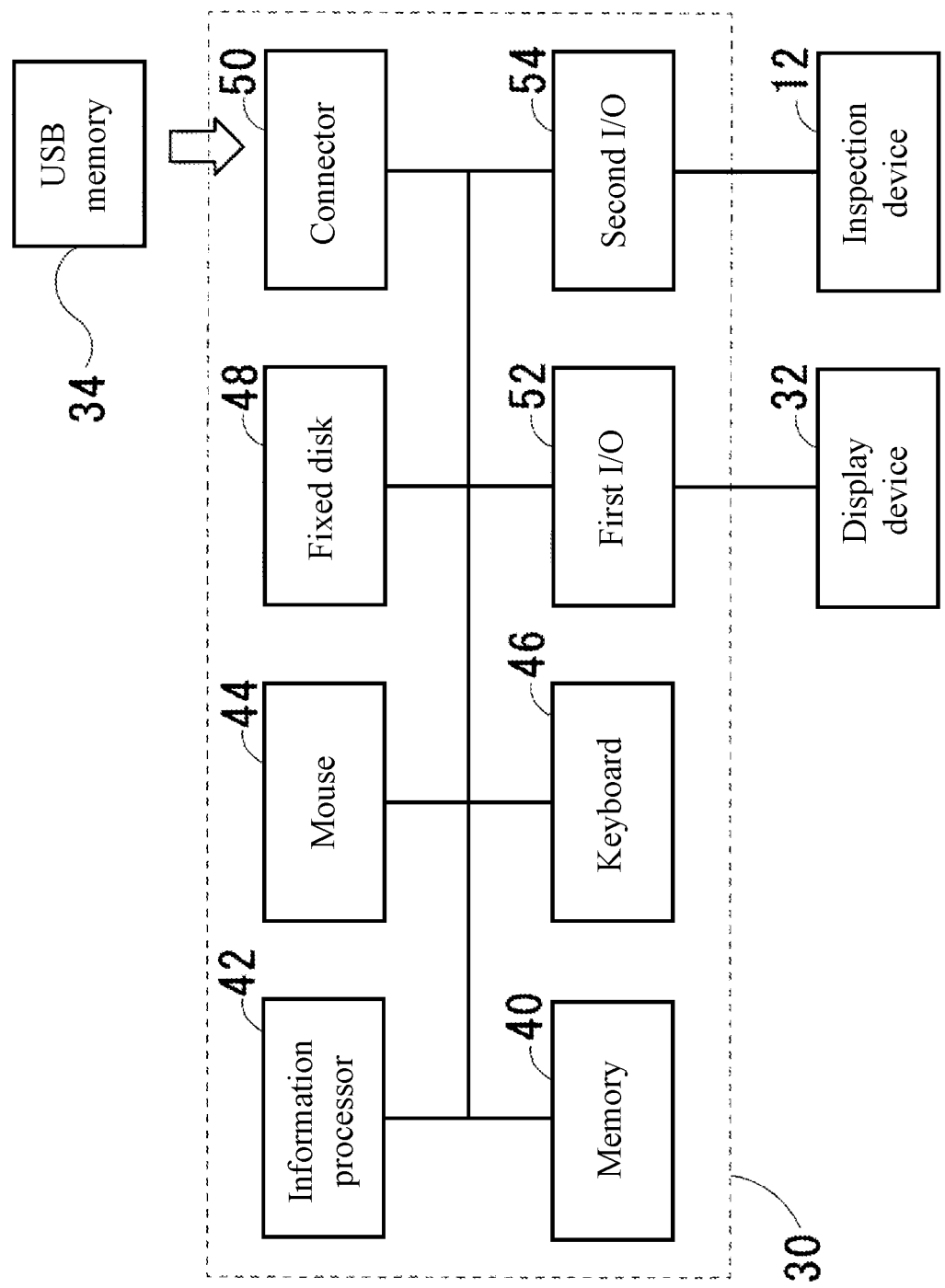
FIG. 2 is a conceptual diagram illustrating a known hardware configuration of a computer.

FIG. 2 is a conceptual diagram illustrating a hardware configuration of the known computer 30 connected to the known display device 32. The hardware configuration of the computer 30 will be described with reference to FIG. 2. The computer 30 of the embodiment includes a memory 40, an information processor 42, a mouse 44, a keyboard 46, a fixed disk 48, a connector 50, a first I/O (Input/Output) 52, a second I/O 54. The memory 40 is constructed with a ROM (Read Only Memory), a RAM (Random Access Memory), and the like. The memory 40 stores a program and data therein. The information processor 42 is constructed with a CPU (Central Processing Unit) and the like. By executing the program read from the memory 40, the information processor 42 controls each device constituting the computer 30 according to a procedure defined in the program. The mouse 44 and the keyboard 46 generate signals in response to operator input. Therefore, the information is input to the computer 30. In the embodiment, the mouse 44 and the keyboard 46 correspond to an input receiver. The input receiver means a portion that receives the information input from the user in the computer 30. The fixed disk 48 records the program and the information transmitted by the inspection device 12. A USB (Universal Serial Bus) memory 34 is connected to the connector 50. The program and information recorded in the USB memory 34 are read into the information processor 42 through the connector 50. In the embodiment, the first I/O 52 is connected to the display device 32. The first I/O 52 outputs a signal to the display device 32. The display device 32 is operated in response to the signal, thereby displaying an image. The second I/O 54 is connected to the inspection device 12. The second I/O 54 receives the signal output from the inspection device 12. Therefore, the second I/O 54 receives the information indicated by the signal.

[Description of Function of Virtual Data Table Production Device]

Figure 3:
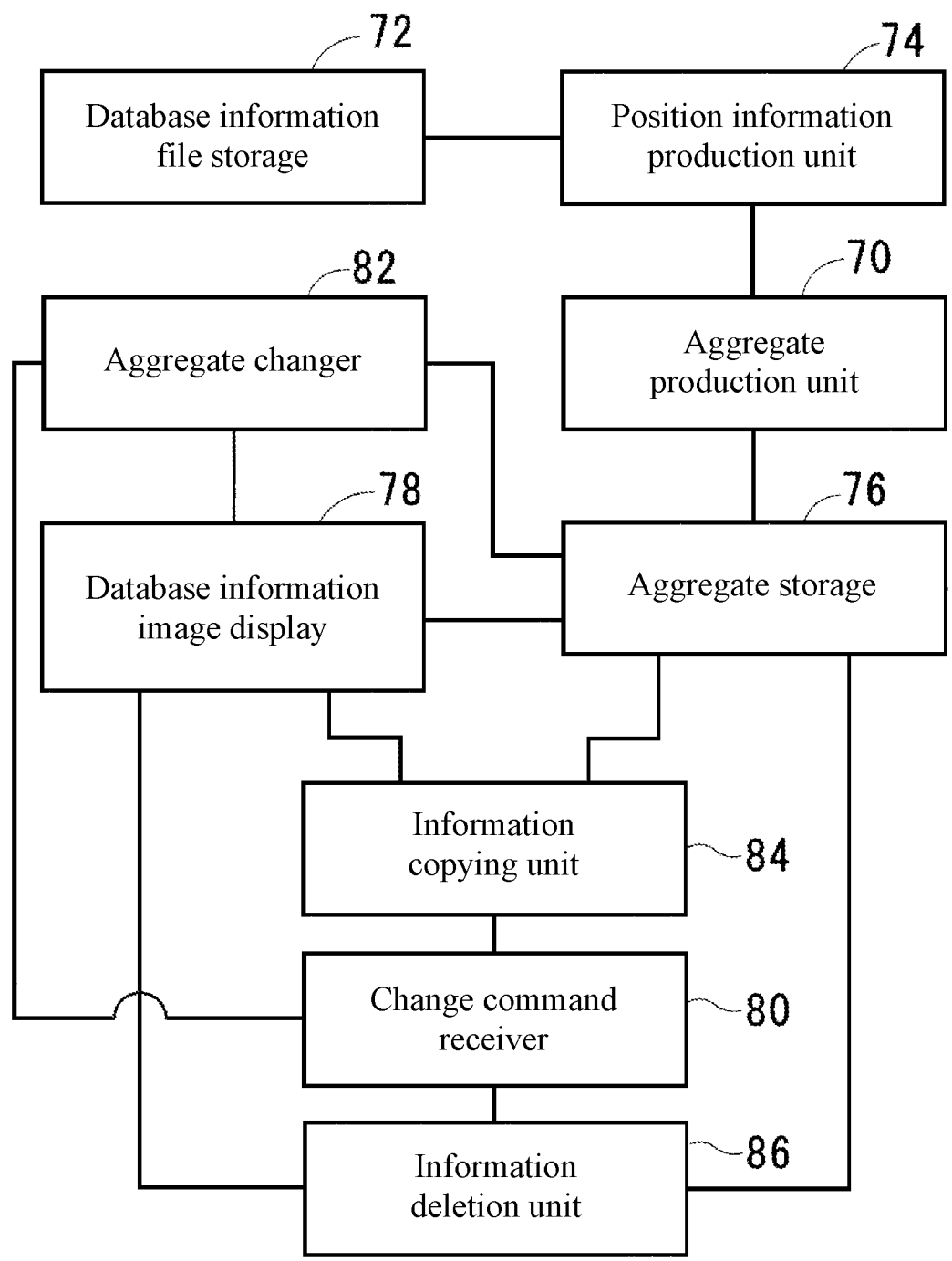
FIG. 3 is a functional block diagram illustrating a virtual data table production device according to the embodiment of the present invention.

FIG. 3 is a functional block diagram of the virtual data table production device 20. The configuration of the virtual data table production device 20 of the embodiment and its function will be described with reference to FIG. 3. The memory 40, information processor 42, mouse 44, keyboard 46, fixed disk 48, connector 50, first I/O 52, and second I/O 54 of the computer 30 and the display device 32 connected to the computer 30 constitute the virtual data table production device 20.

The virtual data table production device 20 includes an aggregate production unit 70, a database information file storage 72, a position information production unit 74, an aggregate storage 76, a database information image display 78, a change command receiver 80, an aggregate changer 82, an information copying unit 84, and an information deletion unit 86.

The aggregate production unit 70 produces a data table. The structure of the data table produced by the aggregate production unit 70 will be described later. The database information file storage 72 stores the database information file.

Figure 4:
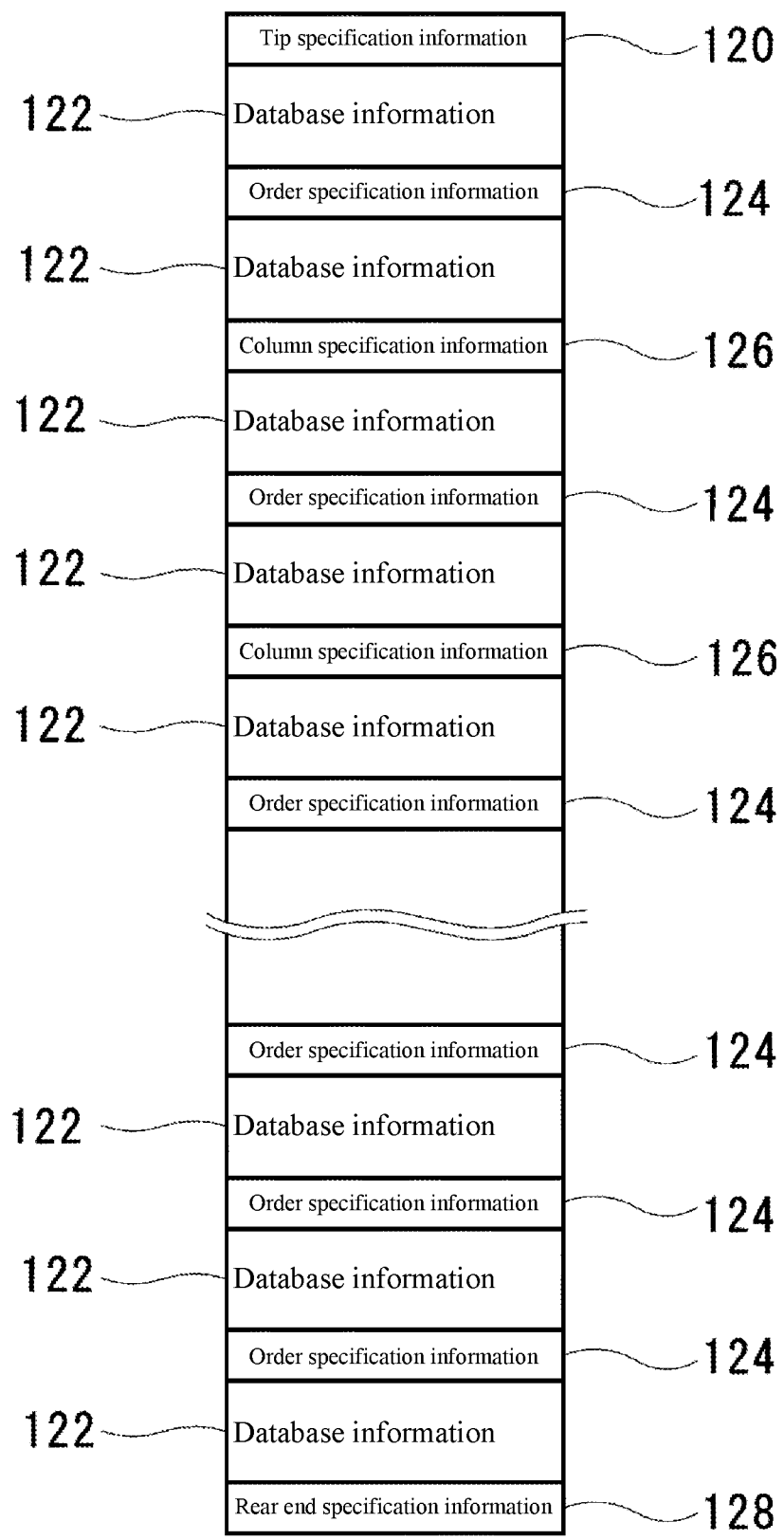
FIG. 4 is a conceptual diagram illustrating a structure of a database information file according to the embodiment of the present invention.

FIG. 4 is a conceptual diagram illustrating a structure of the database information file of the embodiment. In the embodiment, the database information file includes tip specification information 120, a plurality of pieces of database information 122, a plurality of pieces of order specification information 124, a plurality of pieces of column specification information 126, and rear end specification information 128. The tip specification information 120 is information indicating that the position where the tip specification information 120 is located is one end of the database information file. The content of the tip specification information 120 can freely be determined as long as the virtual data table production device 20 can recognize the tip specification information 120. The database information 122 is information added to the database. A specific example of the database information 122 of the embodiment is information obtained through the inspection using the inspection device 12. A specific example of such information is a physical quantity measured during the inspection. The physical quantity is an quantity that can be expressed as a multiple of a given unit while a dimension is fixed under a certain theoretical system in physics. An example of the physical quantity includes a voltage value and a current value. The database information 122 is not limited to the voltage value and the current value. The order specification information 124 is continuously provided so as to be sandwiched between two pieces of database information 122. The order specification information 124 is information indicating that the pieces of database information 122 sandwiching the order specification information 124 therebetween are displayed so as to form one column while being adjacent to the order specification information 124. The content of the order specification information 124 can freely be determined as long as the virtual data table production device 20 can recognize the order specification information 124. For example, the order specification information 124 may also serve as data used to form a blank between characters. Regardless of what kind of data is included in the database information file, when the data is information used to display the pieces of database information 122 sandwiching the data therebetween such that the pieces of database information 122 form one column while being adjacent to the order specification information 124, such information is the order specification information 124. The column specification information 126 is continuously provided so as to be sandwiched between two pieces of database information 122 in spots in the database information file. The column specification information 126 sandwiched between the two pieces of database information 122 is information indicating that one and the other of the pieces of database information 122 are displayed so as to form different columns and that the columns are adjacent to each other. The content of the column specification information 126 can freely be determined as long as the virtual data table production device 20 can recognize the column specification information 126. For example, the column specification information 126 may also serve as data used to form two columns displayed adjacent to each other. Regardless of what kind of data is included in the database information file, when the data is information used to display the two pieces of database information 122 sandwiching the data therebetween such that the two pieces of database information 122 form one and the other of two columns adjacent to each other, such information is the column specification information 126. The rear end specification information 128 is information indicating that the position where the rear end specification information 128 is located is the other end of the database information file. The content of the rear end specification information 128 can freely be determined as long as the virtual data table production device 20 can recognize the rear end specification information 128.

Which position in one column each piece of database information 122 is displayed at is specified in one column by arranging the order specification information 124 between the pieces of database information 122. How the plurality of columns formed by the plurality of pieces of database information 122 are arranged is specified by arranging the column specification information 126 in spots in the database information file. The order specification information 124 is continuously provided according to the rule that the order specification information 124 is continuously provided so as to be sandwiched between two pieces of database information 122 that form one column while being adjacent to the order specification information 124. The column specification information 126 is continuously provided according to the rule that the column specification information 126 is continuously provided so as to be sandwiched between two pieces of database information 122 that form different columns while being adjacent to the column specification information 126. Therefore, the information constructed with the order specification information 124 and the column specification information 126 indicates the display position of each of the plurality of pieces of database information 122. In the database information file, the plurality of pieces of database information 122 and the information indicating the display position of each piece of database information 122 are continuously provided according to a predetermined rule.

The position information production unit 74 illustrated in FIG. 3 produces intra-file position information 134. The intra-file position information 134 is information indicating the position of the database information 122 in the database information file. As described above, in the embodiment, the database information file includes the plurality of pieces of database information 122. In the embodiment, the intra-file position information 134 is information indicating at least two positions of the plurality of pieces of database information 122. The position information production unit 74 produces the intra-file position information 134 by using a predetermined rule as a clue. The rule of the embodiment is the following two rules. The first one is a rule that the order specification information 124 is continuously provided so as to be sandwiched between two pieces of database information 122 that form one column while being adjacent to the order specification information 124. The second one is a rule that the column specification information 126 is continuously provided so as to be sandwiched between two pieces of database information 122 that form different columns while being adjacent to the column specification information 126. The structure of the intra-file position information 134 of the embodiment will be described later. The data table produced by the aggregate production unit 70 is stored in the aggregate storage 76.

The database information image display 78 forms a database information image. The database information image display 78 displays the database information image.

A specific form of the database information image of the embodiment will be described later.

The change command receiver 80 receives input of a change command. The change command is a command indicating a change content of the form of the database information image. A specific content of the change command of the embodiment will be described later.

The aggregate changer 82 performs the following two kinds of processing. The first processing is processing to change the form of the database information image to be matched with the content of the change command. Therefore, the display position of the information designated by the change command in the information included in the database information image is changed in the database information image. A specific procedure to change the display position is the same as a known procedure to change the display position of information. The second processing is processing to change the content of the prototype of the data table produced by the aggregate production unit 70 so as to be matched with the content of the change command. A specific procedure to change the content of the prototype of the data table will be described later.

The information copying unit 84 performs the following two kinds of processing. The first processing is processing to change the form of the database information image to be matched with the content of the change command. Therefore, the information designated by the change command in the information included in the database information image is copied in the database information image. A specific procedure to copy the information in the database information image is the same as a known procedure. The second processing is processing to change the content of the data table produced by the aggregate production unit 70 so as to be matched with the content of the change command. A specific procedure therefor will be described later.

The information deletion unit 86 performs the following two kinds of processing. The first processing is processing to change the form of the database information image to be matched with the content of the change command. Therefore, the information designated by the change command in the information included in the database information image is deleted from the database information image. A specific procedure to delete the information in the database information image is the same as a known procedure. The second processing is processing to change the content of the prototype of the data table produced by the aggregate production unit 70 so as to be matched with the content of the change command. A specific procedure therefor will be described later.

Figure 5:
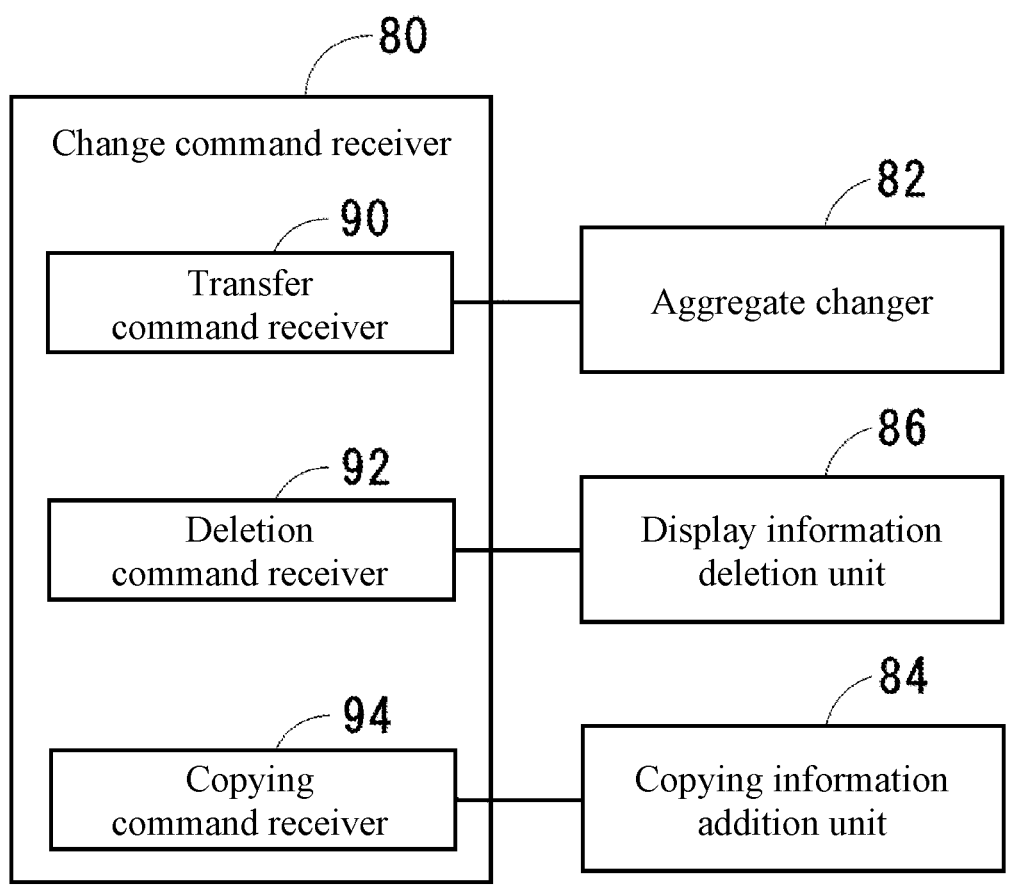
FIG. 5 is a functional block diagram illustrating a change command receiver according to the embodiment of the present invention.

FIG. 5 is a functional block diagram of the change command receiver 80 of the embodiment. A configuration of the change command receiver 80 of the embodiment will be described with reference to FIG. 5. The change command receiver 80 of the embodiment includes a transfer command receiver 90, a deletion command receiver 92, and a copying command receiver 94.

The transfer command receiver 90 receives, as the change command, information indicating the transfer destination of each of at least two pieces of database information 122 indicated in the database information image.

The deletion command receiver 92 receives the change command to delete any one piece of database information 122 indicated in the database information image.

The copying command receiver 94 receives the change command to copy any one piece of database information 122 indicated in the database information image.

Figure 6:
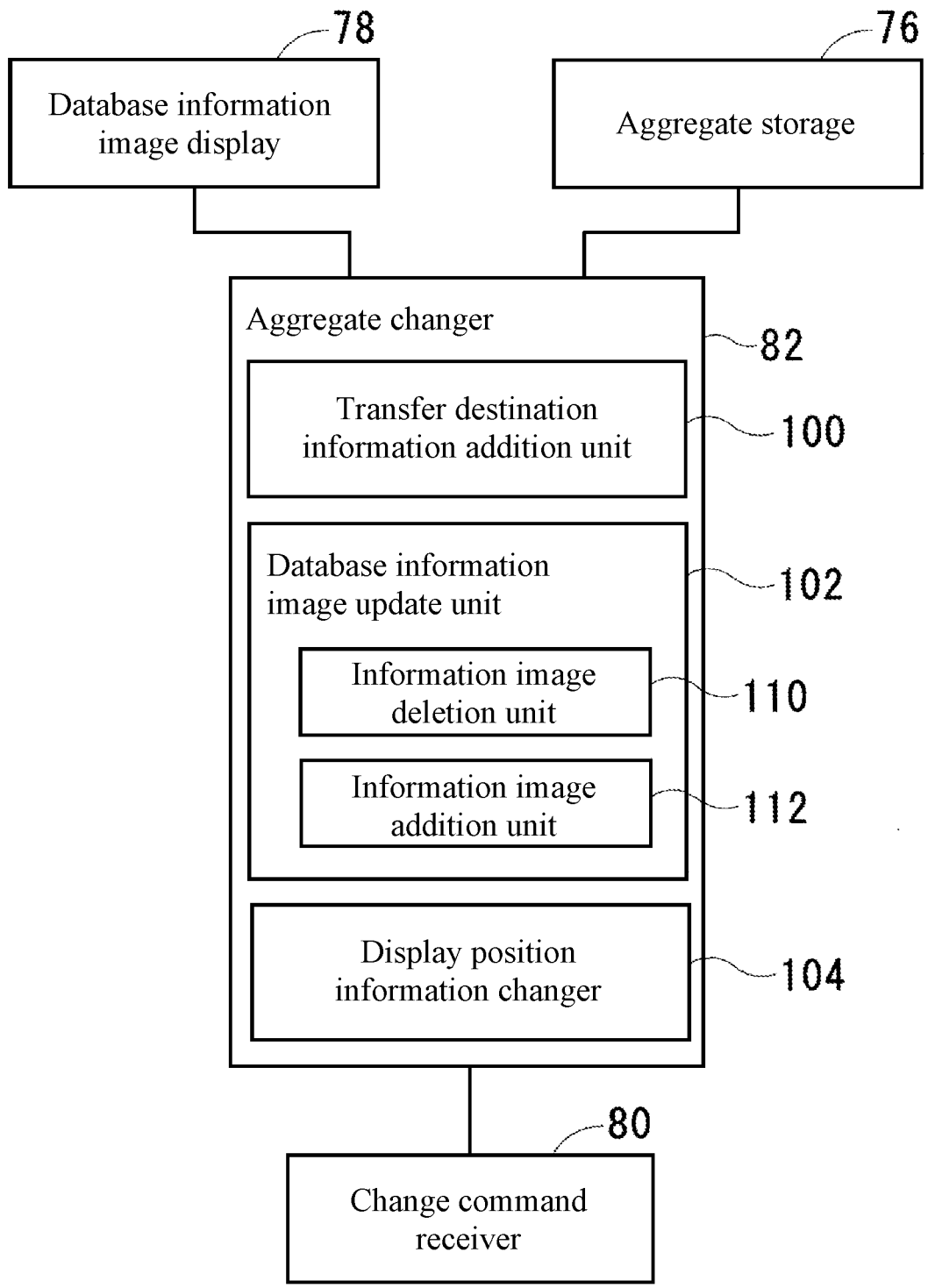
FIG. 6 is a functional block diagram illustrating an aggregate changer according to the embodiment of the present invention.

FIG. 6 is a functional block diagram of the aggregate changer 82 of the embodiment. A configuration of the aggregate changer 82 of the embodiment will be described with reference to FIG. 6. The aggregate changer 82 of the embodiment includes a transfer destination information addition unit 100, a database information image update unit 102, and a display position information changer 104.

The transfer destination information addition unit 100 adds information indicating the transfer destination to the prototype of the data table produced by the aggregate production unit 70. The database information image update unit 102 updates the database information image. The display position information changer 104 changes the content of the prototype of the data table produced by the aggregate production unit 70.

The database information image update unit 102 includes an information image deletion unit 110 and an information image addition unit 112. The information image deletion unit 110 deletes the position specification database information 130, of which the transfer destination is received by the transfer command receiver 90, from the database information image. The information image addition unit 112 adds information to the database information image based on the information received by the copying command receiver 94. A specific content of the added information will be described later.

The virtual addition device 22 and virtual accumulation device 24 of the embodiment are the same as known ones. Therefore, the detailed description will not be repeated.

[Description of Program]

The memory 40, information processor 42, mouse 44, keyboard 46, fixed disk 48, connector 50, first I/O 52, and second I/O 54 of the computer 30 to which the display device 32 is connected constitute the virtual data table production device 20, virtual addition device 22, and virtual accumulation device 24 of the embodiment. These are constructed by causing information processor 42 to execute the program read from the memory 40. Generally, such a program is distributed while being recorded in a computer-readable recording medium such as the USB memory 34. These programs may be distributed through the Internet (not illustrated). These programs are tentatively recorded in the fixed disk 48. The program executed by the information processor 42 is a program, which is recorded on the fixed disk 48 and stored in the memory 40. Therefore, the most essential part of the present invention is software recorded in a computer-readable recording medium such as the USB memory 34.

[Description of Flowchart]

Figure 7:
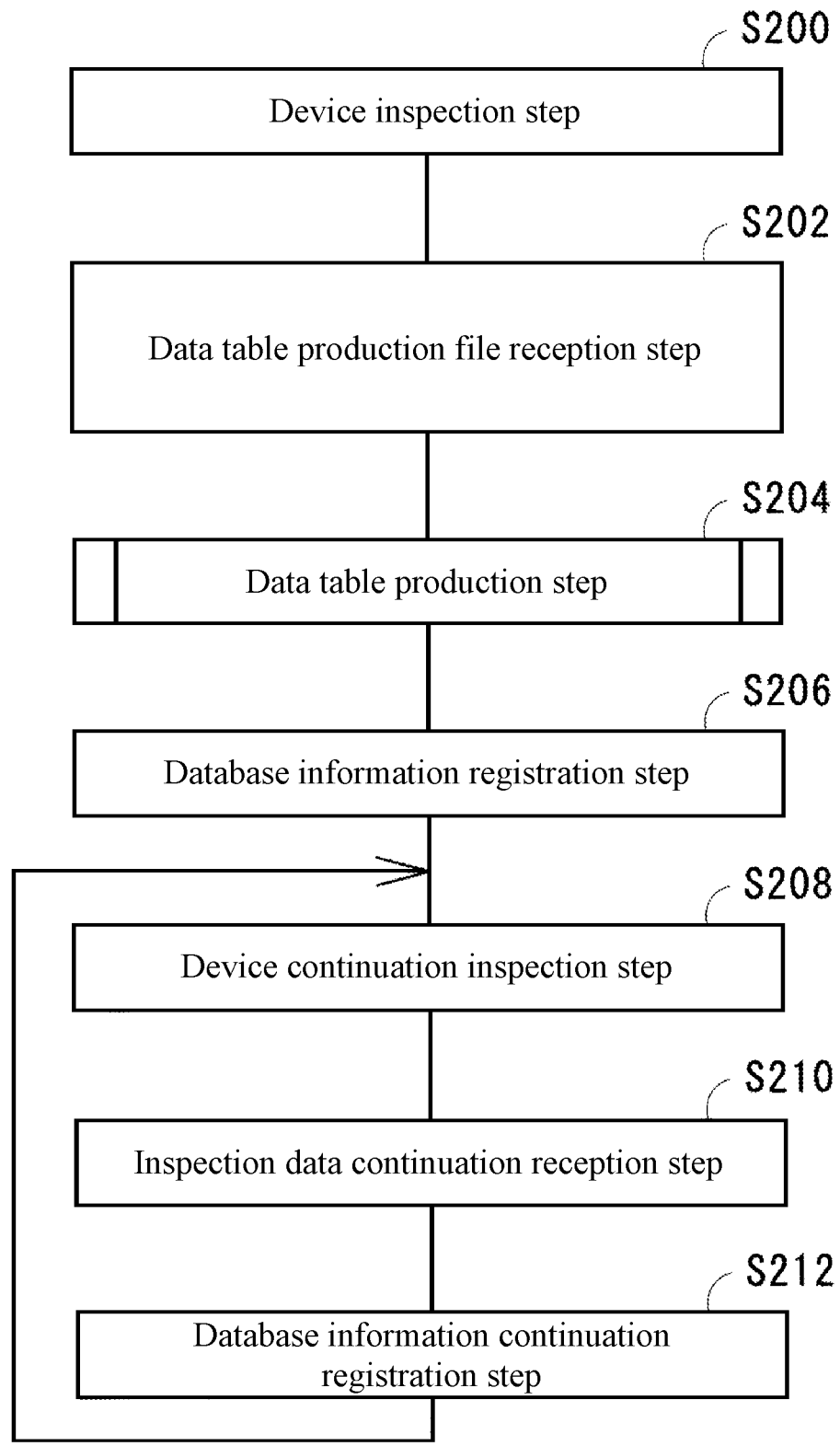
FIG. 7 is a flowchart illustrating steps of a database addition method according to the embodiment of the present invention.

FIG. 7 is a flowchart illustrating steps of a database addition method of the embodiment. The steps of the database addition method performed by the database system of the embodiment will be described with reference to FIG. 7. The database addition method of the embodiment includes a device inspection step S200, a data table production file reception step S202, a data table production step S204, a database information addition step S206, a device continuation inspection step S208, an inspection data continuation reception step S210, and a database information continuation addition step S212.

The device inspection step S200 is a step in which the inspection device 12 inspects the inspection target product 14. The content of the inspection in the step is the same as a known inspection. Therefore, the detailed description will not be repeated. The data table production file reception step S202 is a step in which the inspection device 12 transmits the information obtained through the inspection to the data server 10 as the database information file. The database information file is received by the virtual data table production device 20 and virtual addition device 22 of the data server 10. The data table production step S204 is a step in which the virtual data table production device 20 produces a database based on the database information file received in the data table production file reception step S202. The method performed in this step is the data table production method of the embodiment. The database information addition step S206 is a step in which the virtual addition device 22 adds the information received in the data table production file reception step S202 to the virtual accumulation device 24 based on the data table produced in the data table production step S204. The device continuation inspection step S208 is a step in which the inspection device 12 inspects the inspection target product 14. The content of the device continuation inspection step S208 is the same as the device inspection step S200 except that the inspection is performed to produce the data table or to check the quality of the inspection target product 14. The inspection data continuation reception step S210 is a step in which the inspection device 12 transmits the information obtained through the inspection in the device continuation inspection step S208 as the database information file. The virtual addition device 22 of the data server 10 receives the database information file. The database information continuation addition step S212 is a step in which the virtual addition device 22 adds the information received in the inspection data continuation reception step S210 to the virtual accumulation device 24 based on the data table produced in the data table production step S204.

Figure 8:
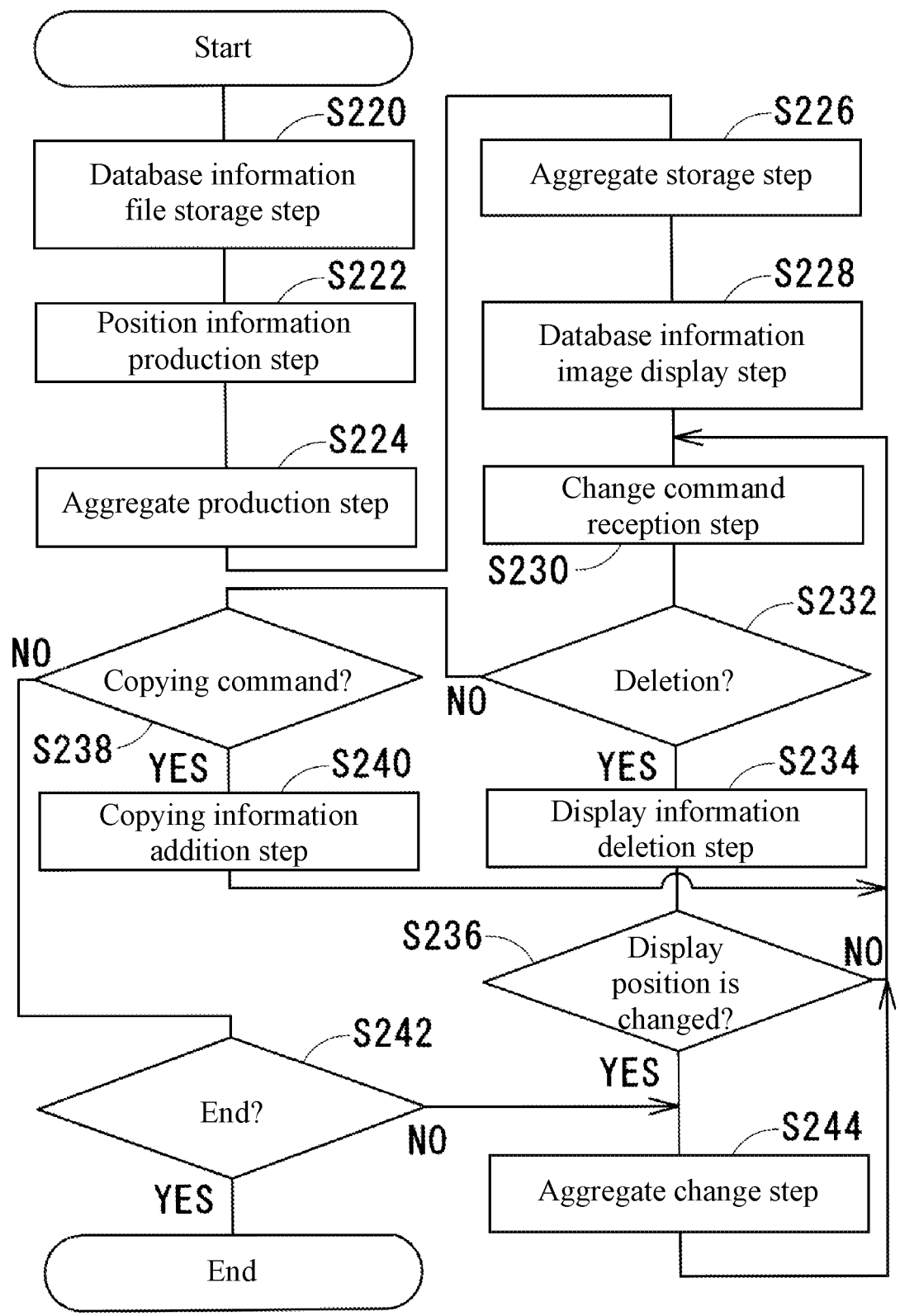
FIG. 8 is a flowchart illustrating steps of a data table production method according to the embodiment of the present invention.

FIG. 8 is a flowchart illustrating steps of the data table production method of the embodiment. The steps of the data table production method performed by the virtual data table production device 20, which is constructed by executing the program of the embodiment using the known computer 30 connected to the known display device 32, will be described with reference to FIG. 8. The data table production method of the embodiment includes a database information file storage step S220, a position information production step S222, an aggregate production step S224, an aggregate storage step S226, a database information image display step S228, a change command reception step S230, a deletion determination step S232, a display information deletion step S234, a change determination step S236, a copying determination step S238, a copying information addition step S240, an end determination step S242, and an aggregate change step S244.

In the database information file storage step S220, the database information file storage 72 (which is constructed with the memory 40) stores the database information file therein.

In the position information production step S222, the position information production unit 74 (which is constructed with the information processor 42 and the memory 40) produces the intra-file position information 134 about all the plurality of pieces of database information 122 included in the database information file. In the embodiment, the intra-file position information 134 is a sequence of numbers. Each numerical value constituting the sequence of numbers indicates an order. The order is an order of the database information 122 in the database information file.

In the position information production step S222, the position information production unit 74 produces the intra-file position information 134 through the following steps. First, the position information production unit 74 reads the information included in the database information file from the head of the database information file. At the same time, the position information production unit 74 detects and stores what numbered information in the pieces of information included in the database information file is read out. Because the detection method is known, the detailed description will not be repeated. Then, the position information production unit 74 determines whether the read information is not the tip specification information 120, the order specification information 124, the column specification information 126, and the rear end specification information 128. When the read information is not the tip specification information 120, the order specification information 124, the column specification information 126, or the rear end specification information 128, the position information production unit 74 stores a numerical value indicating the number of the read information in the pieces of information included in the database information file. In this case, the read information is regarded as the database information 122. When the read information is the order specification information 124 or the column specification information 126, the position information production unit 74 reads the information positioned next to the read information from the database information file. Upon completion of the above determination, the position information production unit 74 detects and stores what numbered information in the pieces of information included in the database information file is read out. By repetition of this process, the numerical value indicating the number of the database information 122 in the database information file is sequentially stored in the position information production unit 74. The number of repetition times that the information included in the database information file is read out may be determined in advance or may be until all the pieces of information included in the database information file are read out. However, it is necessary to store the numerical values with respect to at least two pieces of database information 122. In the embodiment, the position information production unit 74 repeats this process until all the pieces of information included in the database information file are read out. When the reading of the information is completed, the position information production unit 74 changes the numerical values stored therein (the numerical value indicating the number of the read information in the pieces of information included in the database information file) to the sequence of numbers arranged according to the stored order. Because a specific procedure therefor is known, the detailed procedure will not be described. By formation of the sequence of numbers, the intra-file position information 134 is produced based on the above rule defined for the order specification information 124 and the column specification information 126.

In the aggregate production step S224, the aggregate production unit 70 (which is constructed with the information processor 42 and the memory 40) produces the prototype of the data table. In the embodiment, the prototype of the data table is an information aggregate including at least two pieces of position specification database information 130, at least two pieces of display position information 132, and the intra-file position information 134. In the embodiment, the position specification database information 130 is the database information 122 in which the intra-file position information 134 is produced by the position information production unit 74 in the plurality of pieces of database information 122 included in the database information file. In the embodiment, the display position information 132 is information indicating the display position of the position specification database information 130.

In the embodiment, the aggregate production unit 70 produces the prototype of the data table through the following step. First, the aggregate production unit 70 stores the number of times that the order specification information 124 is read and the number of times that the column specification information 126 is read as "0 times". Then, the aggregate production unit 70 reads the information included in the database information file from the head of the database information file. At the same time, the position information production unit 74 detects and stores what numbered information in the pieces of information included in the database information file is read out. Subsequently, the aggregate production unit 70 determines whether the read information is the order specification information 124. When the read information is the order specification information 124, the aggregate production unit 70 updates "the number of times that the order specification information 124 is read" stored therein such that the number of times is increased by one. Next, the aggregate production unit 70 determines whether the read information is the column specification information 126. When the read information is the column specification information 126, the aggregate production unit 70 updates "the number of times that the column specification information 126 is read" stored therein such that the number of times is increased by one. Then, the aggregate production unit 70 determines whether the read information is not the tip specification information 120, the order specification information 124, the column specification information 126, or the rear end specification information 128. When the read information is not the tip specification information 120, the order specification information 124, the column specification information 126, or the rear end specification information 128, the aggregate production unit 70 determines whether the information is the position specification database information 130 based on the information indicating the number of the information in the pieces of information included in the database information file and the intra-file position information 134. When the information is the position specification database information 130, the aggregate production unit 70 stores the information. At the same time, the aggregate production unit 70 stores a combination of the number of times that the order specification information 124 is read at that point of time and the number of times that the column specification information 126 is read at that point of time. In the embodiment, the combination of these times constitutes the display position information 132. Then, the aggregate production unit 70 reads the information located next to the read information from the database information file. At the same time, the aggregate production unit 70 detects and stores which numbered information in the pieces of information included in the database information file is read out. By repetition of this process, the position specification database information 130 is read from the database information file, and the display position information 132 is produced.

Figure 9:
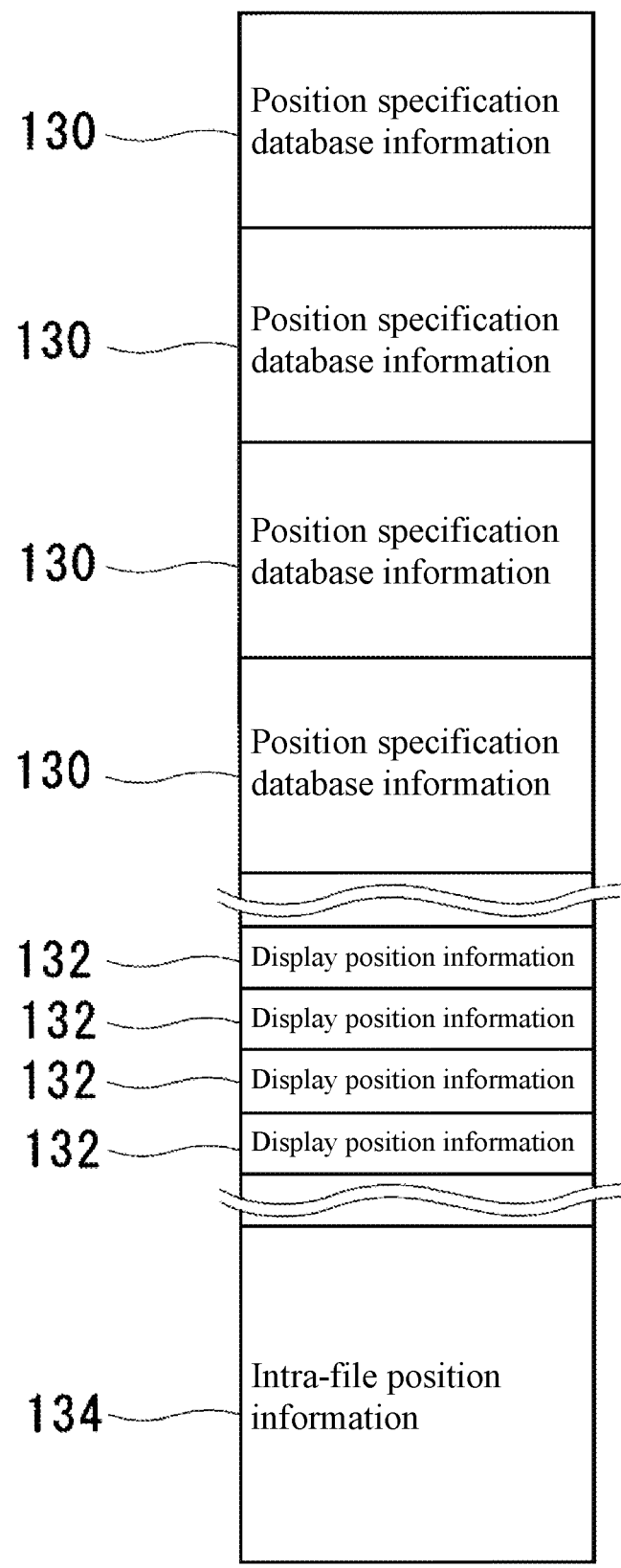
FIG. 9 is a conceptual diagram illustrating a structure of a prototype of a data table according to the embodiment of the present invention.

When the reading of the information from the database information file is completed, the aggregate production unit 70 produces the information aggregate by continuously arranging the position specification database information 130, the display position information 132, and the intra-file position information 134. This is the prototype of the data table. FIG. 9 is a conceptual diagram illustrating a structure of the prototype of the data table of the embodiment. The prototype of the data table of the embodiment includes the plurality of pieces of position specification database information 130, the plurality of pieces of display position information 132, and the intra-file position information 134.

In the embodiment, the pieces of position specification database information 130 are arranged in the order read from the database information file. The pieces of display position information 132 are arranged in the produced order. The numerical values constituting the intra-file position information 134 are also arranged in the produced order. Therefore, the position specification database information 130, the display position information 132, and the numerical value constituting the intra-file position information 134 are correlated with one another on a one-to-one basis.

In the aggregate storage step S226, the aggregate storage 76 (which is constructed with the memory 40) stores the prototype of the data table therein.

In the database information image display step S228, the database information image display 78 (which is constructed with the information processor 42, the memory 40, and the display device 32) forms and displays the database information image. In the embodiment, the database information image is an image in which the position specification database information 130 is displayed at each display position. The database information image is formed based on the position specification database information 130 and the display position information 132, which are included in the prototype of the data table. As is clear from the above description, the number of times that the order specification information 124 is read corresponds to the number of numerical values counted from one end in one column formed by the plurality of pieces of position specification database information 130. The number of times that the column specification information 126 is read corresponds to the number of columns when a plurality of columns formed by the plurality of pieces of position specification database information 130 are arranged. Therefore, the display position of the position specification database information 130 correlated with the display position information 132 can be specified based on the display position information 132. Because of this, it is also possible to form an image of a column formed by the plurality of pieces of position specification database information 130. The database information image display 78 forms the image as the database information image. A specific procedure to form the image in which the information is displayed at the display position when the display position of the information is specified is known. Therefore, the specific procedure to form the database information image will not be described. When the database information image is formed, the database information image display 78 displays the database information image. A specific procedure to display the database information image is also known. Therefore, the specific procedure to display the database information image will not be described.

In the change command reception step S230, the change command receiver 80 (constructed with the mouse 44, the keyboard 46, and the information processor 42) receives the input of the change command. The change command is a command indicating a change content of the form of the database information image. In the embodiment, the kinds of the change commands include a position change command, a deletion command, a copying command, and an end command.

The position change command is a command to change the display position of any piece of position specification database information 130 indicated in the database information image. The position change command includes information for specifying the position specification database information 130 in which the display position is changed and information indicating the transfer destination of the position specification database information 130. The position change command is received by the transfer command receiver 90 (which is constructed with the information processor 42, the memory 40, the mouse 44, and the keyboard 46) of the change command receiver 80. The kinds of the position change commands include a simple movement command and a collective movement command. The simple movement command is a command to change the display position of one piece of position specification database information 130. The collective movement command is a command to change the display positions of at least two pieces of position specification database information 130. The kinds of collective movement commands include a line formation command and a rearrangement command. The column formation command is a command to change the display positions of at least two pieces of position specification database information 130 such that at least two pieces of position specification database information 130 form a column. The rearrangement command is a command to change the display positions of at least two pieces of position specification database information 130 such that lateral and longitudinal positional relationships of at least two pieces of position specification database information 130 change.

The deletion command is a command to designate any one piece of position specification database information 130 indicated in the database information image and then to delete the position specification database information 130 from the database information image. The deletion command is received by the deletion command receiver 92 (which is constructed with the information processor 42, the memory 40, the mouse 44, and the keyboard 46).

The copying command is a command to designate the copying database information and the copying position and then to copy the copying database information at the copying position. The copying database information has the same content as any one piece of position specification database information 130, and is newly produced and displayed. The copying position is the display position of the copying database information. The copying command is received by the copying command receiver 94 (which is constructed with the information processor 42, the memory 40, the mouse 44, and the keyboard 46).

In the deletion determination step S232, the information deletion unit 86 (which is constructed with the information processor 42, the memory 40, and the display device 32) determines whether the change command is the deletion command. When the change command is the deletion command (YES in S232), the processing proceeds to the display information deletion step S234. Otherwise (NO in S232), the processing proceeds to the copying determination step S238.

In the display information deletion step S234, the information deletion unit 86 deletes the position specification database information 130 indicated by the deletion command from the database information image. The information deletion unit 86 changes the prototype of the data table such that the position specification database information 130 designated by the deletion command is deleted from the prototype of the data table. The information deletion unit 86 changes the prototype of the data table such that the display position information 132 correlated with the position specification database information 130 is deleted from the prototype of the data table. The information deletion unit 86 changes the prototype of the data table such that the numerical value correlated with the position specification database information 130 in the numerical values constituting the intra-file position information 134 is deleted.

In the change determination step S236, the transfer destination information addition unit 100 (which is constructed with the information processor 42, the memory 40, and the display device 32) of the aggregate changer 82 determines whether the deletion command is accompanied by the position change command. When the deletion command is accompanied by the position change command (YES in S236), the processing proceeds to the aggregate change step S244. Otherwise (NO in S236), the processing proceeds to the change command reception step S230.

In the copying determination step S238, the information copying unit 84 (which is constructed with the information processor 42, the memory 40, and the display device 32) determines whether the change command is the copying command. When the change command is the copying command (YES in S238), the processing proceeds to the copying information addition step S240. Otherwise (NO in S238), the processing proceeds to the end determination step S242.

In the copying information addition step S240, the information copying unit 84 changes the database information image such that the copying database information designated by the copying command is displayed at the copying position. The information copying unit 84 adds the position specification database information 130 having the same content as the copying database information to the prototype of the data table. The position specification database information 130 in the prototype of the data table is located at the position corresponding to the end of the position specification database information 130. The information copying unit 84 produces the display position information 132 indicating the copying position indicated by the copying command and adds the display position information 132 to the prototype of the data table. This constitutes the display position information 132 correlated with the newly-added position specification database information 130. The display position information 132 in the prototype of the data table is located at the position corresponding to the end of the plurality of pieces of display position information 132. Therefore, the position of the display position information 132 becomes the position corresponding to the position specification database information 130 added by the information copying unit 84. The information copying unit 84 adds a numerical value constituting a part of the intra-file position information 134 to the prototype of the data table. The numerical value is the same as the numerical value indicating the position of the position specification database information 130 having the same content as the copying database information in the database information file.

In the end determination step S242, the information deletion unit 86 (which is constructed with the information processor 42, the memory 40, and the display device 32) determines whether the change command is the end command. When the change command is the end command (YES in S242), the processing is ended. Therefore, the prototype of the data table becomes the data table. Otherwise (NO in S242), the processing proceeds to the aggregate change step S244.

In the aggregate change step S244, the transfer destination information addition unit 100 (which is constructed with the information processor 42 and the memory 40) of the aggregate changer 82 adds information indicating the transfer destination to the prototype of the data table. The database information image update unit 102 (which is constructed with the information processor 42, the memory 40, and the display device 32) changes the database information image. Therefore, the position specification database information 130 specified by the position change command is displayed in the transfer destination indicated by the position change command. The display position information changer 104 (which is also constructed with the information processor 42, the memory 40, and the display device 32) of the aggregate changer 82 changes the content of the display position information 132 corresponding to the position specification database information 130 specified by the position change command such that the content of the display position information 132 is matched with the transfer destination included in the position change command.

[Description of Operation]

The operation of the database system of the embodiment will be described by taking the case that the inspection target product 14 is inspected and the physical quantity measured during the inspection is added to the database as an example.

The inspection device 12 inspects the inspection target product 14 (S200). The inspection device 12 transmits the information obtained through the inspection to the data server 10 as the database information file (S202). The database information file is received by the virtual data table production device 20 and virtual addition device 22 of the data server 10.

Based on the database information file received from the inspection device 12, the database information file storage 72 of the virtual data table production device 20 stores the database information file transmitted from the inspection device 12 (S220). The position information production unit 74 produces the intra-file position information 134 with respect to all the plurality of pieces of database information 122 included in the database information file (S222). The aggregate production unit 70 produces the prototype of the data table (S224). The aggregate storage 76 stores the prototype of the data table (S226). The database information image display 78 forms and displays the database information image (S228).

FIG. 10 is a conceptual diagram illustrating an example of the database information image of the embodiment. The database information image of the embodiment includes a plurality of information display areas 150 arranged in vertical and horizontal directions (6 areas in the horizontal direction×11 areas in the vertical direction=66 areas in FIG. 10), 6 horizontal coordinate display areas 152, and 11 vertical coordinate display areas 154. The position specification database information 130 is displayed in the information display area 150. In the embodiment, a point at an upper left corner of each information display area 150 is an area reference point 160. The number of times that the order specification information 124 is read in the display position information 132 is displayed in the horizontal coordinate display area 152. In the embodiment, the number of times is also a value indicating a component along a horizontal direction of a vector from an origin 170 of the database information image to the area reference point 160 of each information display area 150. The number of times that the column specification information 126 is read in the display position information 132 is displayed in the vertical coordinate display area 154. In the embodiment, the number of times is also a value indicating a component along a vertical direction of the vector from the origin 170 of the database information image to the area reference point 160 of each information display area 150.

In the embodiment, the number of times that the order specification information 124 is read and the number of times that the column specification information 126 is read are also information indicating the additional order of the position specification database information 130 to the database. In the plurality of pieces of position specification database information 130, the position specification database information 130 correlated with the number of times that the order specification information 124 having a small value is read is preferentially added to the database. In the pieces of position specification database information 130 correlated with the number of times that the order specification information 124 having the same value is read, the position specification database information 130 correlated with the number of times that the column specification information 126 having a small value is read is preferentially added to the database.

When the database information image is displayed, the change command receiver 80 receives the input of the change command (S230).

When the following three requirements are sequentially satisfied, the transfer command receiver 90 considers that the simple movement command is input. The first requirement is one that the information display area 150 where the position specification database information 130 is displayed is designated by a pointer (an arrow-shaped graphic, which is displayed together with the database information image, can be moved by operation of the mouse 44, and points out an arbitrary point in the information display area 150). The second requirement is one that the information display area 150 that is kept blank is designated by the pointer. The third requirement is one that a predetermined key of the keyboard 46 is pressed. When the information display area 150 where the position specification database information 130 is displayed is designated by the pointer, the transfer command receiver 90 considers that the information for specifying the position specification database information 130 in which the display position is changed is input. When the information display area 150 that is kept blank is specified by the pointer, the transfer command receiver 90 considers that the information indicating the transfer destination of the position specification database information 130 in which the display position is changed is input.

In the embodiment, when the following requirement is satisfied, the transfer command receiver 90 considers that the collective movement command is input. The requirement is one that a predetermined key of the keyboard 46 is pressed after a numerical value is input to an outer circumferential information area 180. The key is different from the key that is pressed with respect to the third requirement in the above three requirements. Whether the column formation command or the rearrangement command is input is determined by the key pressed at this point. When the requirement is satisfied, the transfer command receiver 90 considers that the information specifying the position specification database information 130 in which the display position is changed and indicating the transfer destination of the position specification database information 130 is input. The outer circumferential information area 180 is the information display area 150, which is kept blank, disposed in an outer circumference of the information display area 150 where the position specification database information 130 is displayed.

Based on the numerical value input to the outer circumferential information area 180 and the position of the information display area 150 to which the numerical value is input, the transfer command receiver 90 specifies the position specification database information 130 in which the display position is changed and the transfer destination of the position specification database information 130. FIG. 11 is a conceptual diagram illustrating an example of the database information image during the input of the position change command of the embodiment. In the database information image in FIG. 11, numerical values are indicated in the outer circumferential information area 180. In the embodiment, when the outer circumferential information area 180 in which the numerical values are indicated is designated by the pointer, the transfer command receiver 90 considers that the information for specifying the position specification database information 130 in which the display position is changed is input. The transfer command receiver 90 considers that the transfer destination of the position specification database information 130 in which the display position is changed is input when the numerical value is input to the outer circumferential information area 180. The position specification database information 130 displayed in the information display area 150 satisfying the following two requirements is the position specification database information 130 in which the display position is changed. The first requirement is one that the information display area 150 forms a vertical column together with the outer circumferential information area 180 to which any one of these numerical values is input. The second requirement is that the information display area 150 forms a horizontal row together with the outer circumferential information area 180 to which any one of these numerical values is input. The position specification database information 130 in which the display position is changed is correlated with two of these numerical values. For example, the position specification database information 130 of "2.822" in the pieces of position specification database information 130 in FIG. 11 forms the vertical column together with the outer circumferential information area 180 to which the numerical value "1" is input. The position specification database information 130 forms the horizontal row together with the outer circumferential information area 180 to which the numerical value "2" is input. Because these requirements are satisfied, the position specification database information 130 is the position specification database information 130 in which the display position is changed. On the other hand, the position specification database information 130 referred to as an "average value" displayed in the information display area 150 is the outer circumferential information area 180 forming the horizontal row together with the position specification database information 130 of the "average value", and the numerical value input thereto does not exist. Therefore, the position specification database information 130 of the "average value" is not the position specification database information 130 in which the display position is changed. The transfer destination of the position specification database information 130 in which the display position is changed is specified based on a combination of the numerical values.

When the following requirement is satisfied, the deletion command receiver 92 considers that the deletion command is input. The requirement is one that the information display area 150 in which the position specification database information 130 is displayed is specified by the pointer and a predetermined key (which is not pressed when the position change command is input) of the keyboard 46 is pressed. In this case, the deletion target is the position specification database information 130 displayed in the information display area 150 specified by the pointer.

In the embodiment, the deletion command receiver 92 considers that the deletion command is input when the collective movement command is input. That is, in the embodiment, the collective movement command also serves as the deletion command. In this case, the deletion target is the position specification database information 130, which is displayed in the information display area 150 but does not satisfy at least one of the following two requirements. The first requirement is one that the information display area 150 forms a vertical column together with the outer circumferential information area 180 to which any one of these numerical values is input. The second requirement is that the information display area 150 forms the horizontal row together with the outer circumferential information area 180 to which any one of the numerical values is input.

When the following requirement is satisfied, the copying command receiver 94 considers that the copying command is input. The requirement is one that the information display area 150 where the position specification database information 130 is displayed is specified by the pointer, the information display area 150 that is kept blank is specified by the pointer, and then a predetermined key (which is neither the key pressed when the change command is input nor the key pressed when the deletion command is input) of the keyboard 46 is pressed. When the information display area 150 where the position specification database information 130 is displayed is designated by the pointer, the copying command receiver 94 considers that the copying database information is input. When the information display area 150 that is kept blank is specified by the pointer, the copying command receiver 94 considers that the copying position is input.

When the input of the change command is received, the information deletion unit 86 determines whether the change command is the deletion command (S232). In this case, when the rearrangement command is input (YES in S232), the information deletion unit 86 deletes the position specification database information 130 indicated by the deletion command from the database information image according to the following procedure (S234).

First, the information deletion unit 86 specifies the horizontal coordinate display area 152 forming the vertical column together with the outer circumferential information area 180 based on the position of the outer circumferential information area 180 to which the numerical value is input. When the horizontal coordinate display area 152 is specified, the information deletion unit 86 specifies the number of times that the order specification information 124 is read, the number of times being indicated by the horizontal coordinate display area 152. When the number of times that the order specification information 124 is read is specified, the information deletion unit 86 correlates the numerical value indicated by the outer circumferential information area 180 with the number of times that the order specification information 124 is read. In the correlation of the embodiment, a sequence of numbers in which the number of times that the order specification information 124 is read and the numerical value indicated by the outer circumferential information area 180 are continuously provided is formed and stored. When the correlation is ended, the information deletion unit 86 specifies the vertical coordinate display area 154 forming the horizontal row together with the outer circumferential information area 180 based on the position of the outer circumferential information area 180 to which the numerical value is input. When the vertical coordinate display area 154 is specified, the information deletion unit 86 specifies the number of times that the column specification information 126 is read, the number of times being indicated by the vertical coordinate display area 154. When the number of times that the column specification information 126 is read is specified, the information deletion unit 86 correlates the numerical value indicated by the outer circumferential information area 180 with the number of times that the column specification information 126 is read. In the correlation of the embodiment, a sequence of numbers in which the number of times that the column specification information 126 is read and the numerical value indicated by the outer circumferential information area 180 are continuously provided is formed and stored. Upon completion of the correlation, the information deletion unit 86 specifies the information display area 150 where the position specification database information 130 of the deletion target is displayed based on the correlation and the display position information 132 included in the prototype of the data table. When the information display area 150 is specified, the information deletion unit 86 updates the database information image such that the information display area 150 becomes blank.

When the database information image is updated, the information deletion unit 86 updates the prototype of the data table according to the following procedure. First, in the display position information 132 of the prototype of the data table, the information deletion unit 86 specifies the display position information 132 in which the number of times that the order specification information 124 is read and the number of times that the column specification information 126 is read are not correlated with the numerical values indicated in the outer circumferential information area 180. In this specification method, it is determined whether the number of times that the order specification information 124 is read and the number of times that the column specification information 126 is read, which are included in the display position information 132, are respectively correlated with the numerical values indicated in the outer circumferential information area 180. When at least one of these numbers of times is not correlated with the numerical value indicated in the outer circumferential information area 180, the information deletion unit 86 deletes the position specification database information 130 corresponding to the display position information 132 from the prototype of the data table. In the numerical values constituting the intra-file position information 134, the information deletion unit 86 deletes the numerical value corresponding to the display position information 132 from the intra-file position information 134. When the position specification database information 130 and the numerical value corresponding to the display position information 132 in the numerical values constituting the intra-file position information 134 are deleted, the information deletion unit 86 deletes the display position information 132 from the prototype of the data table.

Therefore, the position specification database information 130 indicated by the deletion command is deleted from the database information image.

When the position specification database information 130 indicated by the deletion command is deleted from the database information image, the transfer destination information addition unit 100 determines whether the change command is the position change command (S236). In this case, as illustrated in FIG. 11, because the rearrangement command is input (YES at S236), the transfer destination information addition unit 100 adds the information indicating the transfer destination to the prototype of the data table according to the following procedure (S244). First, the transfer destination information addition unit 100 correlates the number of times that the column specification information 126 is read with the numerical value indicated in the outer circumferential information area 180 by the same procedure as the information deletion unit 86 in the deletion determination step S232. The transfer destination information addition unit 100 correlates the number of times that the order specification information 124 is read with the numerical value indicated in the outer circumferential information area 180 by the same procedure as the information deletion unit 86 in the deletion determination step S232. Upon completion of the correlation, the transfer destination information addition unit 100 produces the following information. The information is one in which the display position information 132 included in the prototype of the data table continuously provided in the same order as the order in the prototype of the data table (a copy of the plurality of pieces of display position information 132 included in the prototype of the data table). In the embodiment, the information is referred to as "a prototype of information indicating a transfer destination". The transfer destination information addition unit 100 changes the prototype of the information indicating the transfer destination by the following procedure. First, the transfer destination information addition unit 100 replaces the number of times that the order specification information 124 is read, the number of times being included in the prototype of the information indicating the transfer destination, with the numerical value correlated with the number of times the order specification information 124 is read in the numerical values indicated in the outer circumferential information area 180. For example, the position specification database information 130 of "2296" in FIG. 11 is correlated with the number of times "3" that the order specification information 124 is read and the number of times "8" that the column specification information 126 is read. The transfer destination information addition unit 100 changes the number of times "3" that the order specification information 124 is read to the number of times "1". The transfer destination information addition unit 100 changes the number of times "8" that the column specification information 126 is read out to the number of times "1". The position specification database information 130 of "198" in FIG. 11 is correlated with the number of times "1" that the order specification information 124 is read and the number of times "7" that the column specification information 126 is read. The transfer destination information addition unit 100 changes the number of times "1" that the order specification information 124 is read to the number of times "2". The transfer destination information addition unit 100 changes the number of times "7" that the column specification information 126 is read to the number of times "3". Thus, the prototype of the information indicating the transfer destination becomes the information indicating the transfer destination by changing the number of times that the order specification information 124 is read and the number of times that the column specification information 126 is read and that is included in the prototype of the information indicating the transfer destination. When the information indicating the transfer destination is completed, the transfer destination information addition unit 100 continuously provides the information indicating the transfer destination in the intra-file position information 134 in the prototype of the data table. Therefore, the information indicating the transfer destination is added to the prototype of the data table so as to be correlated with the position specification database information 130 in a one-to-one basis. The information indicating the transfer destination, namely, the numerical value indicated by the outer circumferential information area 180 is originally received as the change command by the transfer command receiver 90.

Figure 12:
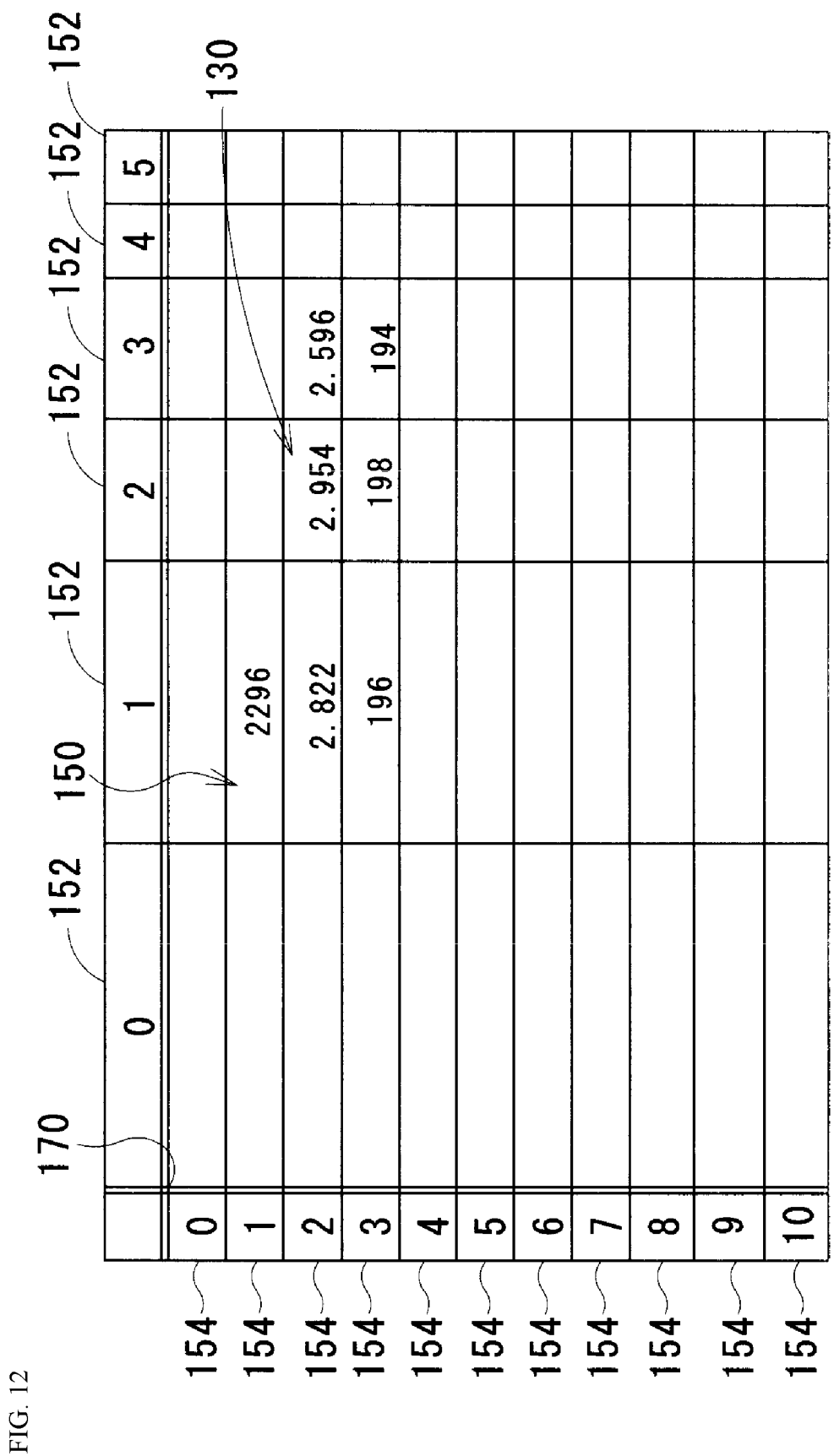
FIG. 12 is a conceptual diagram illustrating the database information image after movement of position specification database information according to the embodiment of the present invention.

When the information indicating the transfer destination is added to the prototype of the data table, the database information image update unit 102 updates the database information image according to the following procedure such that the position specification database information 130 specified by the position change command is displayed in the transfer destination indicated by the position change command (S244). First, the information image deletion unit 110 of the database information image update unit 102 updates the database information image such that all the information display areas 150 become blank. Then, based on the information indicating the transfer destination included in the prototype of the data table, the information image addition unit 112 of the database information image update unit 102 updates the database information image such that the position specification database information 130 is displayed in the information display area 150 specified by the value included in the prototype of the data table. Therefore, the database information image is updated such that the display position of the position specification database information 130 is changed. FIG. 12 is a conceptual diagram of the database information image after movement of position specification database information 130.

When the display position of the position specification database information 130 is changed, the display position information changer 104 changes the content of the display position information 132 according to the following procedure so as to be matched with the transfer destination included in the position change command (S244). First, the display position information changer 104 changes the content of the display position information 132 in the prototype of the data table so as to be matched with the content of the information indicating the transfer destination added to the prototype of the data table by the transfer destination information addition unit 100. Then, the display position information changer 104 deletes the information indicating the transfer destination in the prototype of the data table. Therefore, the content of the display position information 132 corresponding to the position specification database information 130 specified by the position change command is changed so as to be matched with the transfer destination included in the position change command.

When the content of the database information image is changed, and when the prototype of the data table is changed, the change command receiver 80 receives the input of the change command (S230). When the input of the change command is received, the information deletion unit 86 determines whether the change command is the deletion command (S232). In this case, it is assumed that the following three kinds of inputs exist. The first input is one that the information display area 150 where the position specification database information 130 of "2296" in FIG. 12 is displayed is designated by the pointer. The second input is one that the right information display area 150 is designated by the pointer. The third input is one that a predetermined key (which is pressed when the copying command is input) of the keyboard 46 is pressed. In this case, because the copying command is input (NO in S232), the information copying unit 84 determines whether the change command is the copying command (S238).

Figure 13:
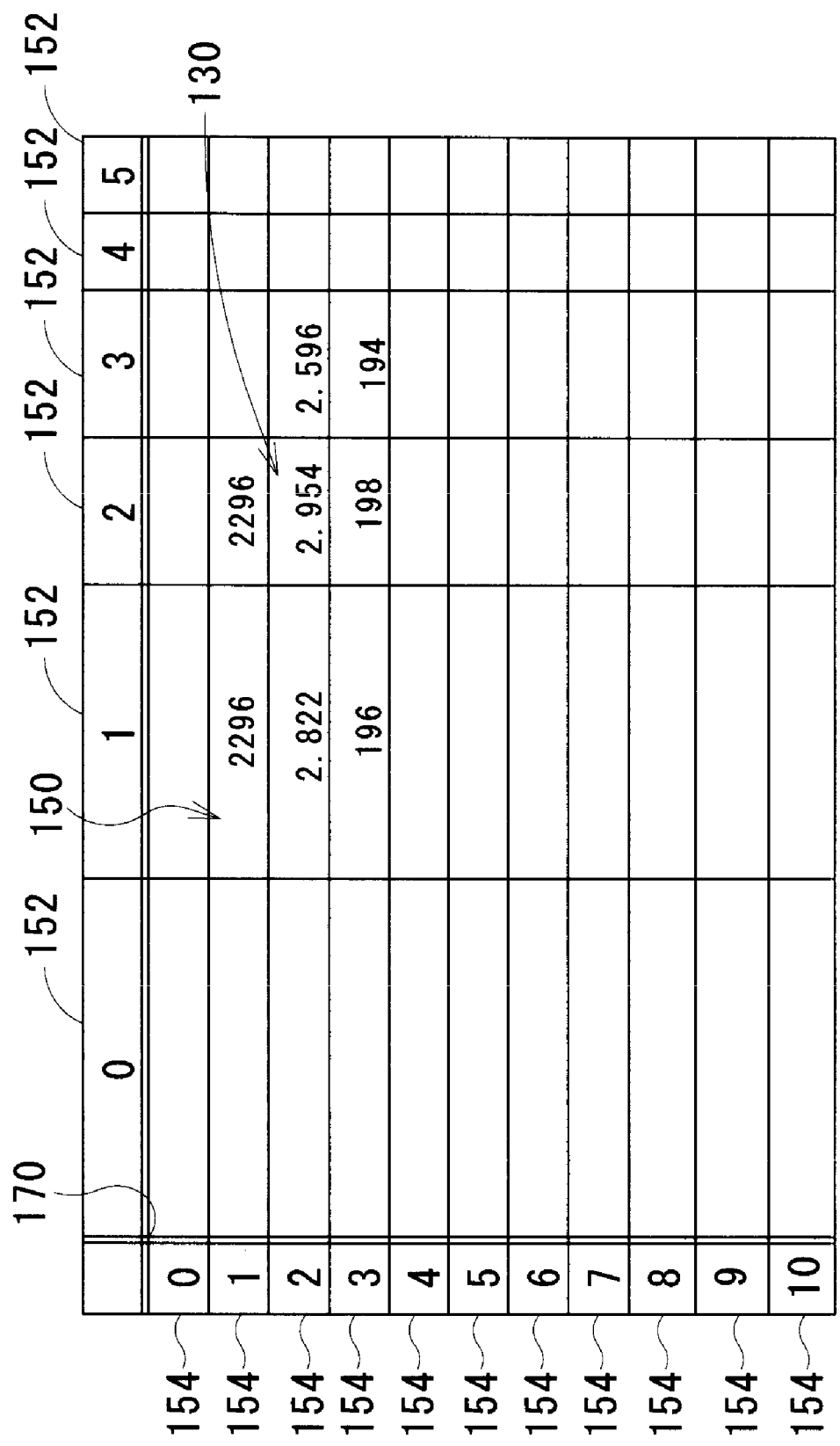
FIG. 13 is a conceptual diagram illustrating the database information image after copying of the position specification database information according to the embodiment of the present invention.

In this case, because the change command is the copying command (YES in S238), the information copying unit 84 changes the database information image according to the following procedure such that the copying database information specified by the copying command is displayed at the copying position. The information copying unit 84 adds the position specification database information 130 having the same content as the copying database information to the prototype of the data table (S240). First, the information copying unit 84 adds the position specification database information 130 having the same content as the copying database information to the prototype of the data table. In this case, position specification database information 130 of "2296" is added. Then, the information copying unit 84 produces the display position information 132 corresponding to the information display area 150 on the right side of the information display area 150 where the position specification database information 130 of "2296" is displayed. As is clear from FIG. 12, the position specification database information 130 of "2296" is originally correlated with the number of times "1" that the order specification information 124 is read and the number of times "1" that the column specification information 126 is read. Accordingly, the number of times that the order specification information 124 correlated with the added position specification database information 130 is read is "2". The number of times that the column specification information 126 correlated with the added position specification database information 130 is read is "1". The information copying unit 84 adds the numbers of times to the prototype of the data table. These are the display position information 132 correlated with the newly-added position specification database information 130. When the new display position information 132 is added, the information copying unit 84 changes the database information image such that the newly-added position specification database information 130 of "2296" is displayed at the position indicated by the new display position information 132. Therefore, the database information image is changed, and the new display position information 132 is added to the prototype of the data table. FIG. 13 is a conceptual diagram of the database information image after the copying of the position specification database information 130.

When the position specification database information 130 is copied, the change command receiver 80 receives the input of the change command (S230). When the input of the change command is received, the information deletion unit 86 determines whether the change command is the deletion command (S232). In this case, it is assumed that the copying command to copy the copied position specification database information 130 of "2296" to the right side of the copied position specification database information 130 of "2296". In this case, because the copying command is input (NO in S232), the information copying unit 84 determines whether the change command is the copying command (S238). In this case, because the change command is the copying command (YES in S238), the information copying unit 84 copies the position specification database information 130 of "2296" in the same manner as immediately before. Therefore, three pieces of position specification database information 130 of "2296" are horizontally arranged in the database information image.

Figure 14:
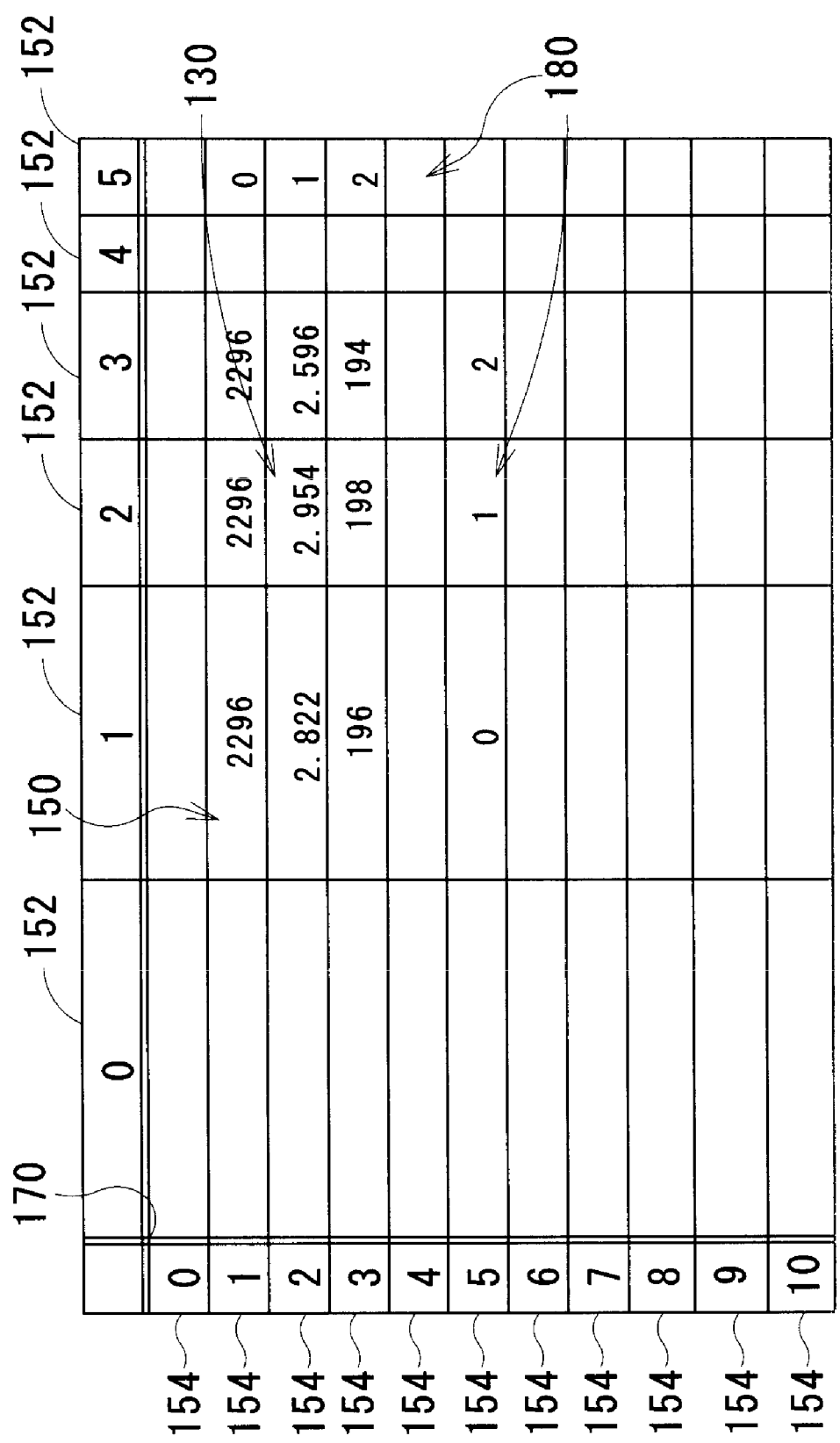
FIG. 14 is a conceptual diagram illustrating an example of the database information image during input of a column formation command according to the embodiment of the present invention.

When the position specification database information 130 is copied again, the change command receiver 80 receives the input of the change command (S230). When the input of the change command is received, the information deletion unit 86 determines whether the change command is the deletion command (S232). In this case, as illustrated in FIG. 14, assuming that a numerical value is input to the outer circumferential information area 180 and that a predetermined key is pressed (eventually, a column formation command is input) (YES in S232), the information deletion unit 86 deletes the position specification database information 130 indicated by the deletion command from the database information image in the same manner as the case that the rearrangement command is input (S234). However, in this case, because the position specification database information 130 of the deletion target does not exist, the position specification database information 130 is not actually deleted.

Then, the transfer destination information addition unit 100 determines whether the change command is the position change command (S236). In this case, as illustrated in FIG. 14, because the line formation command is input (YES in S236), the transfer destination information addition unit 100 adds the information indicating the transfer destination to the prototype of the data table according to the following procedure (S244). First, the transfer destination information addition unit 100 correlates the number of times that the column specification information 126 is read with the numerical value indicated in the outer circumferential information area 180 by the same procedure as the information deletion unit 86 in the deletion determination step S232. The transfer destination information addition unit 100 correlates the number of times that the order specification information 124 is read with the numerical value indicated in the outer circumferential information area 180 by the same procedure as the information deletion unit 86 in the deletion determination step S232. Upon completion of the correlation, the transfer destination information addition unit 100 produces the following information. The information is one that the display position information 132 included in the prototype of the data table are continuously provided in the same order as the order in the prototype of the data table. In the embodiment, the information is referred to as "a prototype of information indicating a transfer destination". The transfer destination information addition unit 100 changes the prototype of the information indicating the transfer destination by the following procedure. First, the transfer destination information addition unit 100 replaces the number of times that the column specification information 126 is read and that is included in the prototype of the information indicating the transfer destination with the following numerical value. The numerical value is one that is calculated by substituting the number of times that the order specification information 124 is read and the number of times that the column specification information 126 is read into a predetermined function. In the embodiment, the predetermined function as used herein means one that the following sum is added to the number of times that the order specification information 124 is read, the number of times being correlated with the position specification database information 130 to be transferred. The sum is a sum of the following product and the number of times that the column specification information 126 is read, the number of times being correlated with the position specification database information 130 to be transferred. The product is obtained by multiplying the number of times that the column specification information 126 is read in the number of times corresponding to the position specification database information 130 to be transferred and the maximum value arranged in the horizontal direction in the numerical values indicated by the outer circumferential information area 180. For example, for the position specification database information 130 of "2.954" in FIG. 14, the number of times "1" correlated with the position specification database information 130 in the number of times that the column specification information 126 is read is replaced with the following value "4". The value is obtained by adding the following sum "3" to the value "1" correlated with the position specification database information 130 to be transferred in the number of times that the order specification information 124 is read. The sum is a sum of the following product "2" and the value "1" correlated with the position specification database information 130 to be transferred in the number of times that the column specification information 126 is read. The product is the product "2" of the value "1" correlated with the position specification database information 130 of "2.954" in the number of times that the column specification information 126 is read and the maximum value "2" of the numerical values arranged horizontally in the numerical values indicated by the outer circumferential information area 180. Then, the transfer destination information addition unit 100 replaces the number of times that the order specification information 124 is read, the number of times being included in the prototype of the information indicating the transfer destination, with the minimum value of the numerical values arranged horizontally in the numerical values indicated by the outer circumferential information area 180. For example, for the position specification database information 130 of "2.954" in FIG. 14, the value "1" included in the prototype of the information indicating the transfer destination in the number of times that the order specification information 124 is read is replaced with the minimum value "0" of the numerical values arranged horizontally in the numerical values indicated by the outer circumferential information area 180. Thus, the prototype of the information indicating the transfer destination becomes the information indicating the transfer destination by changing the number of times that the order specification information 124 is read and the number of times that the column specification information 126 is read and that is included in the prototype of the information indicating the transfer destination. When the information indicating the transfer destination is completed, the transfer destination information addition unit 100 continuously provides the information indicating the transfer destination in the intra-file position information 134 in the prototype of the data table. Therefore, the information indicating the transfer destination is added to the prototype of the data table so as to be correlated with the position specification database information 130 on a one-to-one basis. The information indicating the transfer destination is originally received by the transfer command receiver 90 as the change command. When the information indicating the transfer destination is added to the prototype of the data table, the database information image update unit 102 updates the database information image by the same procedure as the case that the rearrangement command is input such that the position specification database information 130 specified by the position change command is displayed in the transfer destination indicated by the position change command (S244). FIG. 15 is a conceptual diagram of the database information image after the movement of the position specification database information 130. Therefore, the information image addition unit 112 of the database information image update unit 102 forms an area where at least two pieces of position specification database information 130 are displayed side by side in the database information image according to the information indicating the position of each of the at least two pieces of position specification database information 130. Therefore, the additional order of the position specification database information 130 in the database information image is indicated while being correlated with the column.

When the content of the database information image is changed, and when the prototype of the data table is changed, the change command receiver 80 receives the input of the change command (S230). The information deletion unit 86 determines whether the change command is the deletion command (S232). In this case, when the change command is the end command (NO in S232), the information copying unit 84 determines whether the change command is the copying command (S238). In this case, because the end command is input (NO in S238), the information deletion unit 86 determines whether the change command is the end command (S242). In this case, because the end command is input (YES in S242), the processing is ended. Therefore, the prototype of the data table becomes the data table.

When the data table is completed, the virtual addition device 22 adds the information received in the data table production file reception step S202 to the virtual accumulation device 24 based on the data table (S206).

In the embodiment, the virtual addition device 22 adds the database information corresponding to the number of times that the column specification information 126 is read in the display position information 132 of the data table to the virtual accumulation device 24 in the ascending order of the number of times. When the plurality of pieces of database information have the same number of times that the column specification information 126 is read, the virtual addition device 22 adds the database information corresponding to the number of times that the order specification information 124 is read to the virtual accumulation device 24 in the ascending order of the number of times. Therefore, at least a part of the display position information 132 is information indicating the additional order of the database information 122.

Meanwhile, the inspection device 12 inspects the inspection target product 14 different from the previous one (S208). The inspection device 12 transmits the information obtained through the inspection as the database information file. The virtual addition device 22 of the data server 10 receives the database information file (S210). The virtual addition device 22 adds the information received as the database information file based on the data table to the virtual accumulation device 24 (S212). The same processing is repeated. Therefore, the information obtained through the inspection is added to the database.

[Description of Effect]

The user of the virtual data table production device 20 of the embodiment can easily understand the order that the position specification database information 130 located at the position in the database information file is added to the database. When this can be easily understood, confirmation work concerning which piece of the position specification database information 130 in the database information file is added to the database in what order can be reduced in defining the additional order of the position specification database information 130, compared with the case that it cannot be easily understood. The confirmation work can be reduced, so the definition of the additional order of the position specification database information 130 can be facilitated compared with the case that the confirmation work cannot be reduced.

When the information indicating the transfer destination is correlated with the position specification database information 130 on a one-to-one basis, the display position of the position specification database information 130 and the additional order of the position specification database information 130 can be specified even if the display position information 132 is damaged due to an unexpected situation after the information indicating the transfer destination is added to the prototype of the data table. Because such specification is possible, a possibility that the data table becomes unusable can be reduced, compared with the case that such specification is not possible.

When the additional order of the position specification database information 130 is indicated in the database information image while being correlated with the column, the additional order can easily be understood compared with the case that the position specification database information 130 is not indicated so as to form any column. Because the additional order is easily understood, the confirmation work concerning which piece of the position specification database information 130 is added to the database in what order can be reduced. The confirmation work can be reduced, so the definition of the additional order of the position specification database information 130 can be facilitated compared with the case that the confirmation work cannot be reduced.

When the following two requirements are satisfied, the information indicating the component along one of the vertical and horizontal directions of the vector corresponds to the information display area 150. The first requirement is one that the position specification database information 130 is displayed as the database information image. The second requirement is one that the information indicating the additional order of the position specification database information 130 is included in the information indicating the component along one of the vertical and horizontal directions of the following vector. The vector is one from the origin 170 in the database information image indicated by the first requirement to the area reference point 160 of the information display area 150 where the position specification database information 130 is displayed. The information indicating the component along one of the vertical and horizontal directions of the vector corresponds to the information corresponding to the information display area 150, which facilitates the specification of the order of the information indicating the components along one of the vertical and horizontal directions of the vector. When the order is easy to fix, the confirmation work concerning which position specification database information 130 is added to the database in which order can be reduced.

Because the virtual data table production device 20 of the embodiment includes the information deletion unit 86, the user of the virtual data table production device 20 can freely select the position specification database information 130 added to the database.

The embodiment disclosed herein is an example in all respects. The scope of the present invention is not limited to the above embodiment. Various design changes may be made without departing from the scope of the present invention.

For example, in the database information file, the predetermined rule regarding that the plurality of pieces of database information 122 and the plurality of pieces of information indicating the display positions of the pieces of database information 122 range can be used as a clue for producing the intra-file position information 134 using the position information production unit 74 of the embodiment. The specific content of the rule is not limited to one described above.

The specific form of the intra-file position information is not limited to one described above. For example, the intra-file position information may be constructed with numerical values that are continuously provided one-to-one along the respective position specification database information 130 in the data table.

The information included in the display position information 132 indicating the additional order of the position specification database information 130 to the database is not limited to one described above. The information included in the display position information 132 may be any information that is determined in advance for the use in the determination of the additional order when the position specification database information 130 is added to the database.

The data table production device of the present invention does not have to include the information copying unit 84 and the information deletion unit 86.

In the present invention, there is no particular limitation to the structure of the data table. Therefore, for example, the position specification database information 130, the information constituting a component of the display position information 132, and the information constituting a component of the intra-file position information 134 may be mixed in the data table of the present invention.

In the present invention, the prototype of the data table separated from the completed data table may be left. In the database system of the present invention, at least two data tables may be combined. In the data table of the present invention, because the position specification database information 130, the display position information 132, and the series constituting the intra-file position information 134 are separately collected, the data table can easily be combined by separately connecting the position specification database information 130, the display position information 132, and the series constituting the intra-file position information 134 in combining at least two data tables.

DESCRIPTION OF REFERENCE SIGNS

- 10: Data server
- 12: Inspection device
- 14: Inspection target product
- 20: Virtual data table production device
- 22: Virtual addition device
- 24: Virtual accumulation device
- 30: Computer
- 32: Display device
- 34: USB memory
- 40: Memory
- 42: Information processor
- 44: Mouse
- 46: Keyboard
- 48: Fixed disk
- 50: Connector
- 52: First I/O
- 54: Second I/O
- 70: Aggregate production unit
- 72: Database information file storage
- 74: Sequential position information production unit
- 74: Position information production unit
- 76: Aggregate storage
- 78: Database information image display
- 80: Change command receiver
- 82: Aggregate changer
- 84: Information copying unit
- 86: Information deletion unit
- 90: Transfer command receiver
- 92: Deletion command receiver
- 94: Copying command receiver
- 100: Transfer destination information addition unit
- 102: Database information image update unit
- 104: Display position information changer
- 110: Information image deletion unit
- 112: Information image addition unit
- 120: Tip specification information
- 122: Database information
- 124: Order specification information
- 126: Column specification information
- 128: Rear end specification information
- 130: Position specification database information
- 132: Display position information
- 134: Intra-file position information
- 150: Information display area
- 152: Horizontal coordinate display area
- 154: Vertical coordinate display area
- 160: Area reference point
- 170: Origin
- 180: Outer circumferential information area

The invention claimed is:

1. A data table production method comprising:
   an aggregate production step in which a computer connected to a display device produces an information aggregate including: intra-file position information indicating at least two positions of a plurality of pieces of database information in a database information file including the plurality of pieces of database information which are of information to be added to a database; and information indicating an additional order of the plurality of pieces of database information to the database, the positions of the plurality of pieces of database information being indicated by the intra-file position information, the computer including a memory in which information is stored, an information processor that processes the information stored in the memory, an input receiver that receives an information input from a user, and an I/O that outputs the information to the display device;
   a database information file storage step of storing the database information file in the memory, the plurality of pieces of database information and information indicating a display position of each of the plurality of pieces of database information being continuously provided according to a predetermined rule in the database information file;
   a position information production step in which the information processor produces the intra-file position information with respect to at least two of the plurality of pieces of database information included in the database information file by using the predetermined rule as a clue,
   the aggregate production step including a step in which the information processor produces the information aggregate further including position specification database information which is of the database information in which the intra-file position information is produced in the position information production step in the plurality of pieces of database information included in the database information file, in addition to the intra-file position information and the information indicating the additional order of the plurality of pieces of database information to the database,
   the intra-file position information indicating a position of the position specification database information in the database information file,
   information indicating an additional order of the position specification database information to the database being included in the information aggregate so as to be at least a part of display position information indicating the display position of the position specification database information;
   an aggregate storage step of storing the information aggregate in the memory;
   a database information image display step in which the information processor controls the display device such that a database information image in which at least two of the position specification database information are displayed at the display positions of the at least two of the position specification database information is formed based on the display position information, and such that the database information image is displayed by outputting information to the display device through the I/O;

a change command reception step in which the input receiver receives an input of a change command that is of a command indicating a change content of a form of the database information image; and an aggregate change step in which the information processor changes the display position of the position specification database information indicated by the change command, and changes a content of the display position information indicating the display position of the position specification database information indicated by the change command, in the information aggregate, such that the content of the display position information is matched with a content of the change command, when the change command is a command to change the display position of any one of the position specification database information indicated in the database information image.

* * * * *